(12) United States Patent
Baba et al.

(10) Patent No.: US 8,341,327 B2
(45) Date of Patent: Dec. 25, 2012

(54) COMPUTER SYSTEM AND METHOD FOR SHARING PCI DEVICES THEREOF

(75) Inventors: Takashige Baba, Inagi (JP); Toshiomi Moriki, Kokubunji (JP); Keitaro Uehara, Kokubunji (JP)

(73) Assignee: Hitachi, Ltd., Tokyo (JP)

( * ) Notice: Subject to any disclaimer, the term of this patent is extended or adjusted under 35 U.S.C. 154(b) by 182 days.

(21) Appl. No.: 12/546,264

(22) Filed: Aug. 24, 2009

(65) Prior Publication Data
US 2010/0082874 A1    Apr. 1, 2010

(30) Foreign Application Priority Data
Sep. 29, 2008  (JP) .................................. 2008-250208

(51) Int. Cl.
G06F 13/00    (2006.01)
G06F 13/36    (2006.01)
(52) U.S. Cl. ......................... 710/316; 710/315; 710/317
(58) Field of Classification Search .................. 710/305, 710/306, 316, 317
See application file for complete search history.

(56) References Cited

U.S. PATENT DOCUMENTS

| | | | |
|---|---|---|---|
| 6,621,713 B2 | 9/2003 | Amaike et al. | |
| 7,058,738 B2 | 6/2006 | Stufflebeam, Jr. | |
| 7,529,860 B2 * | 5/2009 | Freimuth et al. ................... | 710/8 |
| 7,725,632 B2 * | 5/2010 | Baba et al. ..................... | 710/104 |
| 7,809,977 B2 | 10/2010 | Takamoto | |
| 7,917,681 B2 | 3/2011 | Suzuki et al. | |
| 7,979,592 B1 | 7/2011 | Pettey et al. | |
| 7,991,839 B2 | 8/2011 | Freimuth et al. | |
| 2003/0012204 A1 | 1/2003 | Czeiger et al. | |
| 2004/0103210 A1 | 5/2004 | Fujii et al. | |
| 2007/0165596 A1 | 7/2007 | Boyd et al. | |
| 2008/0117907 A1 | 5/2008 | Hein | |
| 2008/0137677 A1 | 6/2008 | Boyd et al. | |
| 2009/0248973 A1 * | 10/2009 | Deshpande et al. .......... | 711/108 |
| 2009/0276551 A1 * | 11/2009 | Brown et al. ................... | 710/72 |

(Continued)

FOREIGN PATENT DOCUMENTS
JP    2002-032153    1/2002
(Continued)

OTHER PUBLICATIONS

"PCI-SIG—Multi-Root Resource Discovery and Allocation" by Renato Recio; Dated Apr. 26, 2006, 23 pages.*

(Continued)

*Primary Examiner* — Brian Misiura
(74) *Attorney, Agent, or Firm* — Antonelli, Terry, Stout & Kraus, LLP.

(57) ABSTRACT

In order to provide an inexpensive way to share an I/O device loaded in an I/O drawer among a plurality of blades, in a server system including a plurality of servers, a PCI device, and a manager for initializing a PCI switch, the PCI device has a plurality of virtual functions (VFs). The PCI switch, which has VF allocation information which indicates association between the servers and the VFs, is configured to: receive a transaction from one of the servers or from the PCI device; when the received transaction is a transaction sent from the one of the servers, remove a server identifier with which a sender server is identified and transfer the received transaction to the PCI device; and when the received transaction is a transaction sent from the PCI device, attach a server identifier that is determined based on the VF allocation information.

11 Claims, 24 Drawing Sheets

U.S. PATENT DOCUMENTS

2011/0004688 A1 1/2011 Matthews et al.
2011/0016235 A1* 1/2011 Brinkmann et al. .............. 710/8

FOREIGN PATENT DOCUMENTS

| | | |
|---|---|---|
| JP | 2007-219873 | 8/2007 |
| JP | 2008-021252 | 1/2008 |

OTHER PUBLICATIONS

"Multi-root I/O Virtualization and Sharing Specification Revision 1.0"—Dated May 12, 2008, 260 pages.*

PCI-SIG, "Single Root I/O Virtualization and Sharing Specification, Revision 1.0, Section 1: Architectural Overview," Sep. 11, 2007, pp. 15-34.

Office Action, dated Apr. 4, 2012, issued in counterpart U.S. Appl. No. 12/709,405.

Office Action issued on Jun. 26, 2012, in connection with Japanese Patent Application No. 2008-250208.

Jun Suzuki, Simultaneous Multi-Host Sharing of Single-root I/O Virtualization with ExpEther Interconnect, Mar. 2008, pp. 1-23 to 1-24, vol. 1.

* cited by examiner

MR-IOV CAPABILITY FORMAT

| Bit offset 31 | 20 19 | 16 15 | 0 | Byte offset |
|---|---|---|---|---|
| NEXT CAPABILITY OFFSET | 01H (VERSION) | 000BH (VENDOR SPECIFIC) (PCI EXPRESS EXTENDED CAPABILITY ID) | | 00h |
| 008H (VSEC LENGTH) | 01H (VSEC REV) | 0001H VSEC ID INDICATING MR-IOV CAPABILITY | | 04h |

FIG. 19

COMPUTER SYSTEM AND METHOD FOR SHARING PCI DEVICES THEREOF

CLAIM OF PRIORITY

The present application claims priority from Japanese patent application JP2008-250208 filed on Sep. 28, 2008, the content of which is hereby incorporated by reference into this application.

BACKGROUND OF THE INVENTION

This invention relates to a blade server with a plurality of computers, and more particularly, to a technology of sharing a single I/O device among a plurality of computers.

As people become more conscious of information security and information compliance, information systems of business organizations are demanded to process more processing requests such as virus scan and mail filtering on the server side. Business organizations have dealt with the increased processing requests by introducing a server for each different processing operation. However, an increase in server count increases running cost and cuts into the IT budget of a company to a degree that it poses a problem.

In view of this problem, server integration is attracting attention which reduces the count of servers constituting an information system by consolidating processing operations that have been executed on a plurality of servers in a single high-performance server. Server integration can curtail power consumption and occupied floor space which rise continuously in proportion to the server count, maintenance cost for hardware failure, and the like.

Blade servers in which CPUs are integrated densely are gaining ground as a measure to implement server integration (see, for example, JP 2002-32153 A). A typical blade server is structured such that a single housing houses a plurality of blades in which CPUs (processors), memories, and network interface cards (NICs) are mounted, a network switch, and an I/O drawer with expansion I/O slots. With a blade server, server integration can be implemented effectively for a server that executes processing over a network.

In blade servers, however, expansion I/O slots of an I/O drawer are associated with blades in a fixed manner. A resultant problem is that an I/O slot is reserved even for a blade that uses other I/O cards than NICs infrequently or not at all, which is a waste of space. Another problem is that a blade whose use requires many I/O cards (for example, a hot-standby architecture set up among a plurality of blades) cannot be allocated with more I/O slots than the count of I/O slots within an I/O drawer.

Technologies for sharing a single I/O device among a plurality of hosts have been proposed for blade servers and the like in which the count of I/O slots (or I/O devices) is limited as a technique of enabling a multitude of blades to use the limited I/O slots.

Known such technologies include Single Root IO Virtualization (SR-IOV) and Multi Root IO Virtualization (MR-IOV), which are standardized by the PCI Special Interest Group (PCI-SIG) (see, for example, U.S. Pat. No. 7,058,738 B and PCI-SIG, "Single Root I/O Virtualization and Sharing Specification, Revision 1.0, Section 1: Architectural Overview," 2007, pp. 15-34).

SUMMARY OF THE INVENTION

Also, iSCSI is widely known as a technology for sharing a storage system among arbitrary servers. The iSCSI technology encapsulates a SCSI command, which is used for access between a server and the storage system, in a packet of TCP/IP, which is a network communication protocol. Arbitrary servers can thus share a target device compliant with iSCSI.

In Single Root IO Virtualization (hereinafter abbreviated as SR-IOV) mentioned above as a prior art example, a physical function (PF) of a single I/O device can provide a plurality of virtual functions (VFs). The plurality of virtual functions are used exclusively by a plurality of OS instances within the same blade, thereby allowing the OS instances to share a single I/O device that is compliant with SR-IOV.

In Multi Root IO Virtualization (hereinafter abbreviated as MR-IOV) mentioned above as a prior art example, a single I/O device is equipped with a plurality of physical functions (PFs) each of which provides a plurality of virtual functions (VFs). Using an I/O device that is compliant with MR-IOV in combination with the introduction of virtualization software enables virtual machines (VMs) operating on different physical servers to share a single I/O device. In other words, MR-IOV allows a specific blade (physical computer) to use a single PF exclusively, while the exclusive use of a plurality of VFs provided by the PF is permitted to respective VMs.

An SR-IOV-compliant I/O device, which only needs to have a single physical function, can be procured at a lower cost than that of obtaining an MR-IOV-compliant I/O device.

If an I/O device that is compliant with SR-IOV described above is used in the blade server of the above-mentioned prior example when a plurality of blades are to share an I/O device, the I/O device procurement cost can be kept low but, because blades are allocated with I/O devices on a one-on-one basis, sharing a single I/O device among a plurality of blades is not possible.

On the other hand, if an I/O device that is compliant with MR-IOV described above is used in the blade server of the above-mentioned prior example when a plurality of blades are to share an I/O device, sharing a single I/O device among a plurality of blades is possible, but an MR-IOV-compliant I/O device costs higher to procure than an SR-IOV-compliant I/O device and pushes up introduction cost.

Using iSCSI described above in a blade server allows blades to share a storage system, but iSCSI cannot be employed when the blade server's I/O devices are NICs or the like.

This invention has been made in view of the above-mentioned problems, and it is therefore an object of this invention to provide an inexpensive way to share an I/O device loaded in an I/O drawer among a plurality of blades in a blade server which has the plurality of blades.

A representative aspect of this invention is as follows. A method of sharing a PCI device in a server system comprising a plurality of servers, the PCI device, a PCI switch for coupling the plurality of servers and the PCI device, and a manager for initializing the PCI switch, the PCI device having a plurality of virtual functions (VFs), the PCI switch having VF allocation information which indicates association between the plurality of servers and the plurality of VFs, the method comprising: receiving, by the PCI switch, a transaction from one of the plurality of servers or from the PCI device; performing, by the PCI switch, when the received transaction is a transaction sent from the one of the plurality of servers, processing of removing a server identifier with which a sender server is identified and transferring the received transaction to the PCI device; and performing, by the PCI switch, when the received transaction is a transaction sent from the PCI device, processing of attaching a server identifier that is determined based on the VF allocation information to the transaction and transferring the received transaction to an associated one of the plurality of servers.

This invention thus enables a plurality of servers to share a single PCI device, in particular, a PCI device that is compliant with SR-IOV.

BRIEF DESCRIPTION OF THE DRAWINGS

FIG. 19 shows an embodiment of this invention and is an explanatory diagram illustrating an example of an MR-IOV capability format.

DETAILED DESCRIPTION OF THE PREFERRED EMBODIMENT

An embodiment of this invention is described below with reference to the accompanying drawings.

Figure 1:
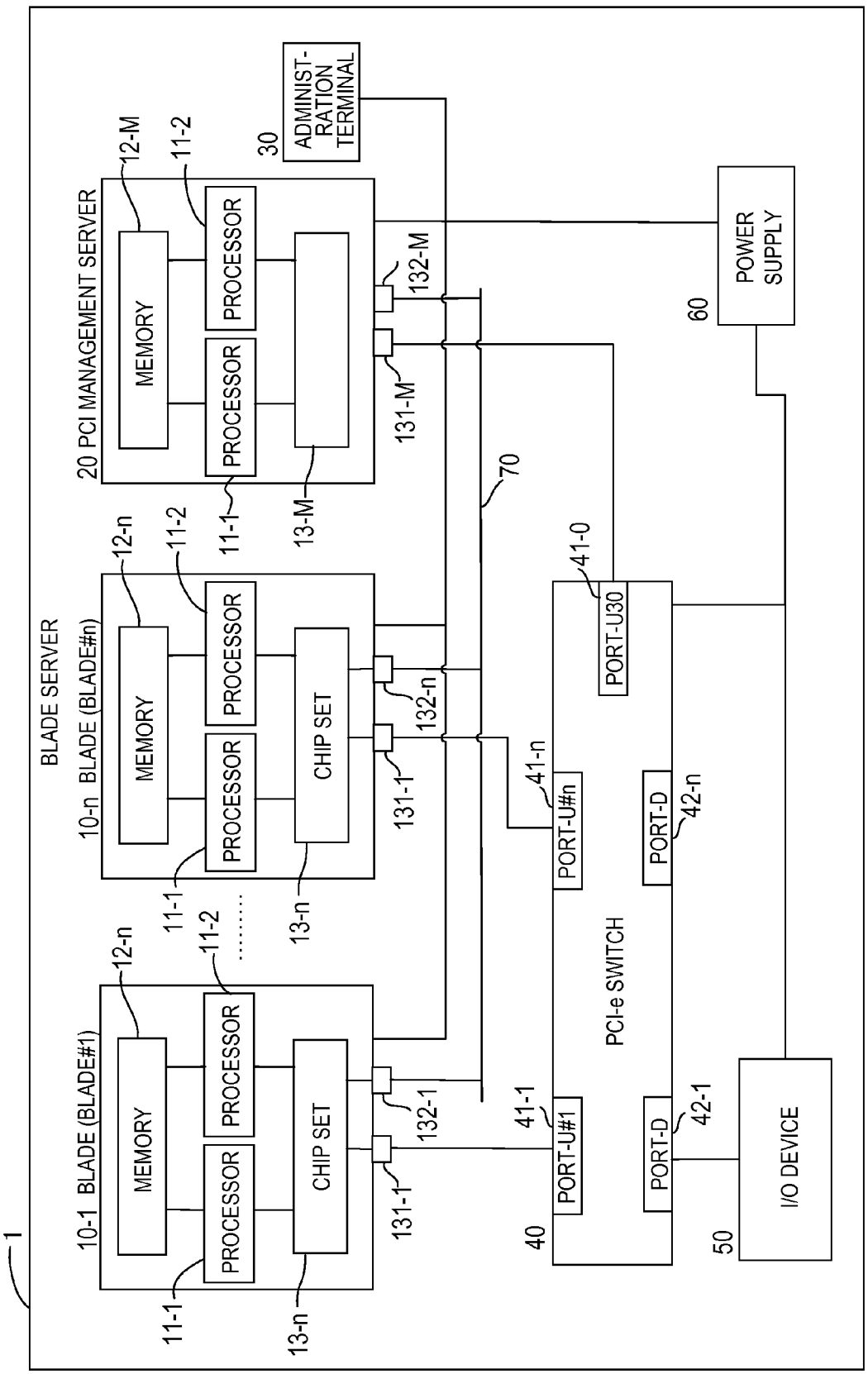
FIG. 1 illustrates an embodiment of this invention and is a block diagram of a blade server (compound computer system) to which this invention is applied.

FIG. 1 illustrates an embodiment of this invention and is a block diagram of a blade server (compound computer system) to which this invention is applied. In FIG. 1, a blade server 1 includes n blades 10-1 to 10-n, which function as physical computers, an I/O device 50, which is compliant with Single Root IO Virtualization (hereinafter abbreviated as SR-IOV), a PCI-e switch 40, which couples the blades 10-1 to 10-n where transactions (packets) are processed by Multi Root IO Virtualization (hereinafter abbreviated as MR-IOV) with the I/O device 50, a PCI management server (PCI management computer) 20, which manages the allocation of the I/O device 50 to the blades 10-1 to 10-n, an administration terminal 30, which is operated by a user or an administrator to control the blade server 1, and a power supply 60, which supplies power to the components of the blade server 1. The PCI-e switch 40 and the I/O device 50 are coupled by an interface that is compliant with the PCI Express standards defined by the above-mentioned PCI-SIG (http://www.p-cisig.com/). While FIG. 1 illustrates an example in which one PCI-e switch 40 and one I/O device 50 are provided, the blade server 1 can have a plurality of PCI-e switches 40 and a plurality of I/O devices 50.

The blade 10-1 is made up of hardware including one or more CPUs (processors) 11-1 and 11-2, at least one memory 12-1, and at least one chip set 13-1. The blade 10-n and the PCI management server 20 have the same hardware configuration as that of the blade 10-1.

The blades 10-1 to 10-n are coupled to the PCI management server 20 via a network 70. A local area network (LAN) or an inter-integrated circuit ($I^2C$) can be employed as the network 70. A baseboard management controller (BMC) may be mounted to each of the blades 10-1 to 10-n so that the BMCs collect the configuration information (configuration)

and power on/off status of their respective blades 10-1 to **10-*n* and notify the collected information to the PCI management server 20**.

The chip sets 13-1 to **13-*n* of the blades 10-1 to 10-*n* respectively have I/O ports 131-1 to 131-*n* and network interfaces 132-1 to 132-*n*. The chip set 13-M of the PCI management server 20 has an I/O port 131-M and a network interface 132-M. The I/O ports 131 are compliant with PCI Express. The network interfaces 132 are compliant with the standards of a LAN such as Ethernet (registered trademark). The network interfaces 132-1 to 132-*n* of the chip sets 13-1 to 13-*n* and the network interface 132-M of the chip set 13-M are coupled to the network 70, whereas the I/O ports 131-1 to 131-*n* of the chip sets 13-1 to 13-*n* and the I/O port 131-M of the chip set 13-M are coupled to the PCI-e switch 40**.

The PCI-e switch 40 has upstream ports 41-0 to **41-*n*, which are coupled to the chip sets 13 of the blades 10-1 to 10-*n* and the PCI management server 20, and downstream ports 42-1 to 42-*n*, to which the I/O device 50** is coupled.

In the example of FIG. 1, the I/O port 131-1 of the chip set 13-1 of the blade 10-1 is coupled to the upstream port 41-1 of the PCI-e switch 40, the I/O port **131-*n* of the chip set 13-*n* of the blade 10-*n* is coupled to the upstream port 41-*n* of the PCI-e switch 40, the I/O port 131-M of the chip set 13-M of the PCI management server 20 is coupled to the upstream port 41-0 of the PCI-e switch 40, and the I/O device 50 is coupled to the downstream port 42-1**.

The connection between the blades 10-1 to **10-*n* and the PCI-e switch 40 and the connection between the I/O device 50 and the PCI-e switch 40 can be made with the use of a backplane of the blade server 1** or the like.

In the PCI-e switch 40, the upstream ports 41-1 to **41-*n* are compliant with MR-IOV and the downstream ports 42-1 to 42-*n* are compliant with SR-IOV, and hence the upstream ports 41-1 to 41-*n* exchange Multi Root IO Virtualization transactions (packets) with the blades 10-1 to 10-*n* whereas Single Root IO Virtualization packets are sent and received between the downstream ports 42-1 to 42-*n* and the I/O device 50. The PCI-e switch 40** therefore performs processing of converting Multi Root IO Virtualization packets to and from Single Root IO Virtualization packets.

The administration terminal 30 having an input/output device (not shown) is coupled to the PCI management server 20 and, when operated by an administrator or others, gives a command to a PCI manager 202, which is described later.

Figure 2:
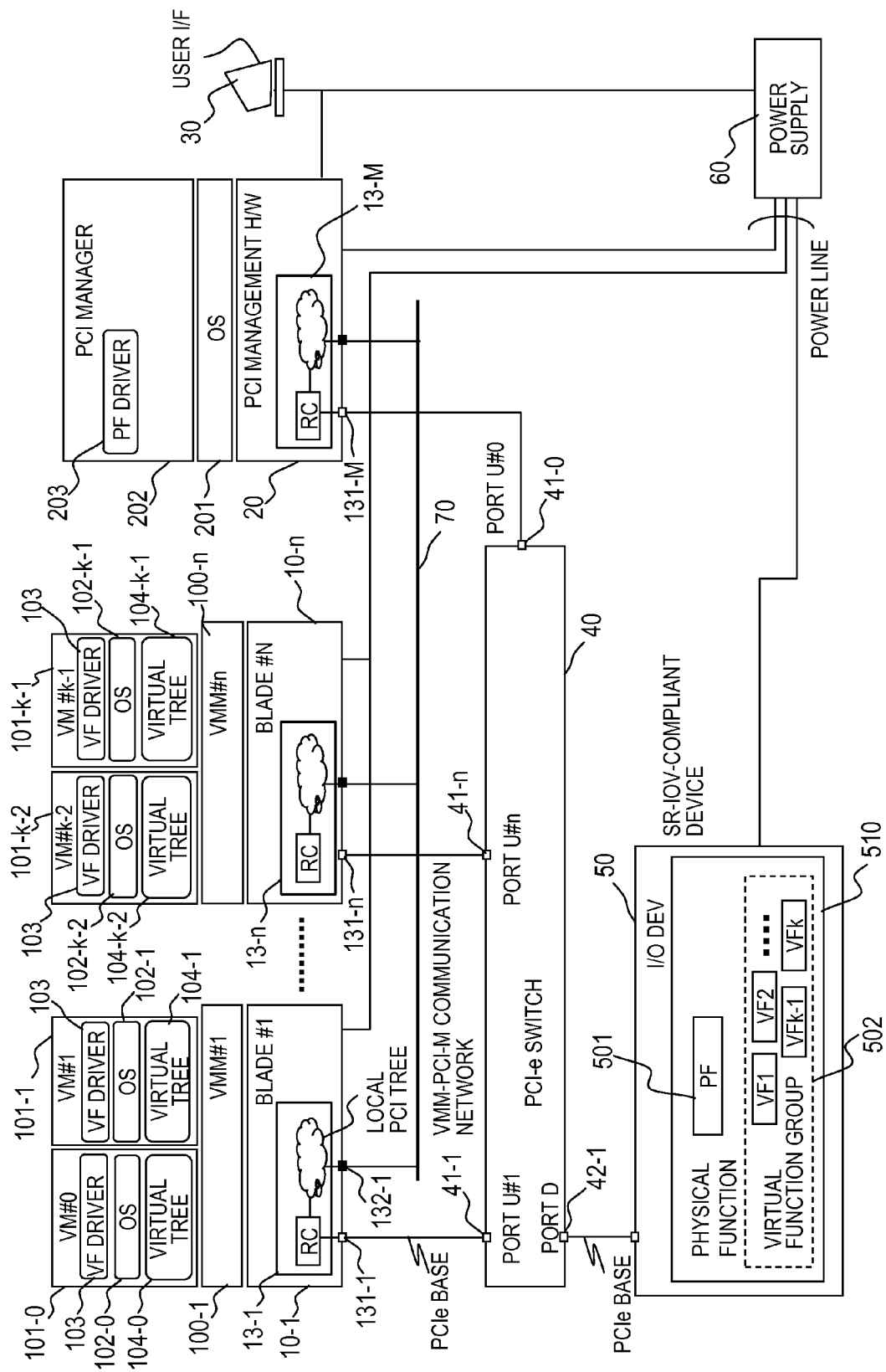
FIG. 2 shows an embodiment of this invention and is a block diagram illustrating function elements of the blade server 1.

FIG. 2 is a block diagram illustrating function elements of the blade server 1. Virtual machine monitors (VMMs) 100-1 to **100-*n* which are software components are run on the blades 10-1 to 10-*n*, and provide a plurality of virtual machines 101-0 to 101-*k*-1. In the blade 10-1, two virtual machines 101-0 and 101-1 are created on the virtual machine monitor 100-1, and the virtual machines 101-0 and 101-1 execute an OS 102-0 and 102-1, respectively. A VF driver 103 for utilizing a virtual function (VF) of the I/O device 50 is loaded onto each of the OS 102-0 of the virtual machine 101-0 and the OS 102-1 of the virtual machine 101-1. The rest of the blades 10 including 10-*n* are configured the same way as the blade 10-1, and hence each blade 10 runs a plurality of virtual machines (101-*k*-1 and 101-*k*-2 in the case of the blade 10*n*) which each execute the OS 102 and each have the VF driver 103 to utilize a virtual function of the I/O device 50. The respective OSs 102-0 to 102-*k*-1 of the virtual machines 101-0 to 101-*k*-1** execute arbitrary application programs or services.

In the PCI management server 20, the PCI manager 202 which manages the blades 10-1 to **10-*n*, the PCI-e switch 40, and the I/O device 50 is run on an OS 201. A PF driver 203 for utilizing a physical function (PF) of the I/O device 50 is loaded onto the OS 201 of the PCI management server 20**.

The I/O device 50, which is accessed by the virtual machines 101-0 to **101-*k*-1 and by the PCI management server 20, is a PCI Express I/O device compliant with SR-IOV that provides one physical function (PF) 501 and a plurality of virtual functions (VFs) 502. The physical function 501 and the virtual functions 502 are functions provided by a control module 510 of the I/O device 50, and the count of the virtual functions 502 and the like are determined by a request from the PCI management server 20. FIG. 2 illustrates an example in which the I/O device 50 provides k virtual functions 502**, VF1 to VFk.

The chip sets 13-1 to **13-*n* of the blades 10-1 to 10-*n* and the VF driver 103 of each of the virtual machines 101-1 to 101-*k*-1 send and receive PCI Express packets that are compliant with MR-IOV. The I/O device 50**, on the other hand, sends and receives PCI Express packets that are compliant with SR-IOV.

The PCI-e switch 40, which is a feature of this invention, performs packet conversion between the MR-IOV-compliant upstream ports 41-1 to **41-*n* and the SR-IOV-compliant downstream ports 42-1 to 42-*n* in a manner described later, thereby enabling the plurality of blades 10-1 to 10-*n* to share the SR-IOV-compliant I/O device 50**.

The chip sets 13-1 to **13-*n* and 13-M, which are components of the blades 10-1 to 10-*n* and the PCI management server 20, respectively, each contain a root complex (RC) as the protocol hierarchy of PCI Express. The root complex manages a local PCI tree that descends down to the I/O device 50** serving as an end point.

As is described later, the PCI manager 202 of the PCI management server 20 manages the initialization of PCI trees to be allocated to the blades 10-1 to **10-*n*, a topology from the PCI-e switch 40 to the I/O device 50, and the association relation of PCI trees allocated to the blades 10-1 to 10-*n*, and sets, for each of the blades 10-1 to 10-*n*, MR-IOV settings between the blade and the PCI-e switch 40**.

The PCI manager 202 also functions as a module for managing the blades 10-1 to **10-*n*, and manages the virtual machines 101-0 to 101-*k*-1 and the OSs 102-0 to 102-*k*-1 that the respective virtual machine monitors 100-1 to 100-*n* of the blades 10-1 to 10-*n*** create and activate.

Figure 3:
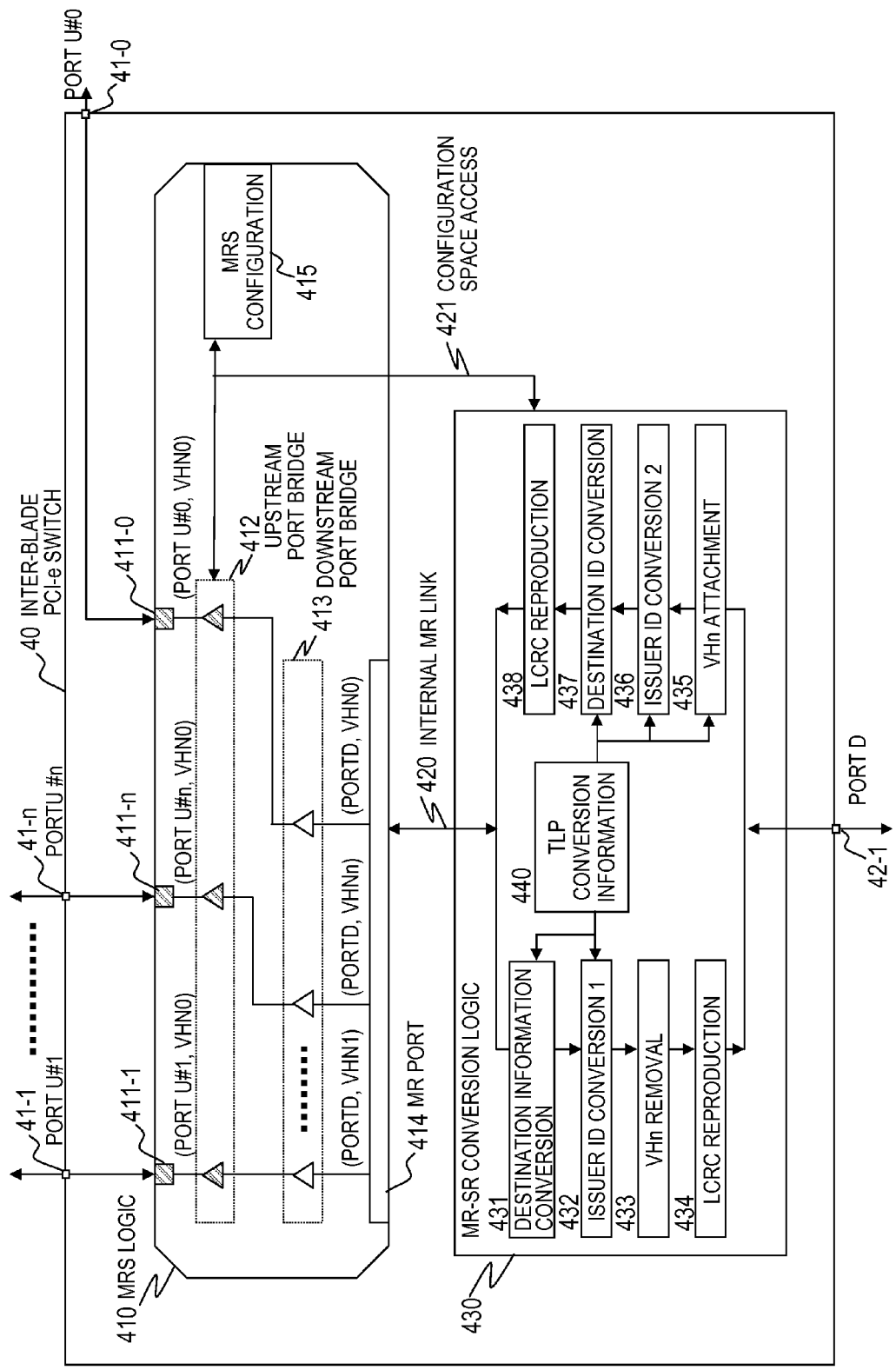
FIG. 3 shows an embodiment of this invention and is a block diagram illustrating the configuration of the PCI-e switch 40.

FIG. 3 is a block diagram illustrating the configuration of the PCI-e switch 40. In the PCI-e switch 40, the upstream ports 41-1 to **41-*n*, which are coupled to the blades 10-1 to 10-*n*, respectively, to send and receive MR-IOV packets, is coupled to multi-root switch (hereinafter abbreviated as MRS) logic 410, whereas the downstream ports 42-1 to 42-*n* coupled to the I/O device 50, are coupled to multi root-single root (hereinafter referred to as MR-SR) conversion logic 430, which converts SR-IOV packets to and from MR-IOV packets. FIG. 3 illustrates only the MR-SR conversion logic 430 that is associated with the downstream port 42-1 but, actually, the MR-SR conversion logic 430 is provided for each of the downstream ports 42-1 to 42*n***.

The multi-root switch (MRS) logic 410 has ports 411-0 to 411*n*, which are coupled to the upstream ports 41-0 to **41-*n*, an upstream port bridge 412, which is coupled to the ports 411-0 to 411-*n*, a downstream port bridge 413, which is coupled to the upstream port bridge 412, a multi-root port 414, which is coupled to the downstream port bridge 413, and multi-root switch (MRS) configuration information (configuration) 415, which contains, among others. The MRS configuration information 415 is used to manage the routing of the ports 411-0 to 411-*n* and the multi-root port 414. The MRS configuration information 415** is coupled to the upstream port bridge 412 via a configuration space access path 421 to be accessible to the upstream ports 41-0 to 41-*n*, and can be accessed from, for example, the PCI management server 20 coupled to the upstream port 41-0. The configuration space access path 421 is also coupled to the MR-SR conversion logic 430, thereby enabling the PCI management server 20 to access the MR-SR conversion logic 430 as well from the MRS logic 410 via the configuration space access path 421.

The multi-root port 414 of the MRS logic 410 is coupled to MR-SR conversion logic 430 via an internal multi-root link 420.

Figure 6:
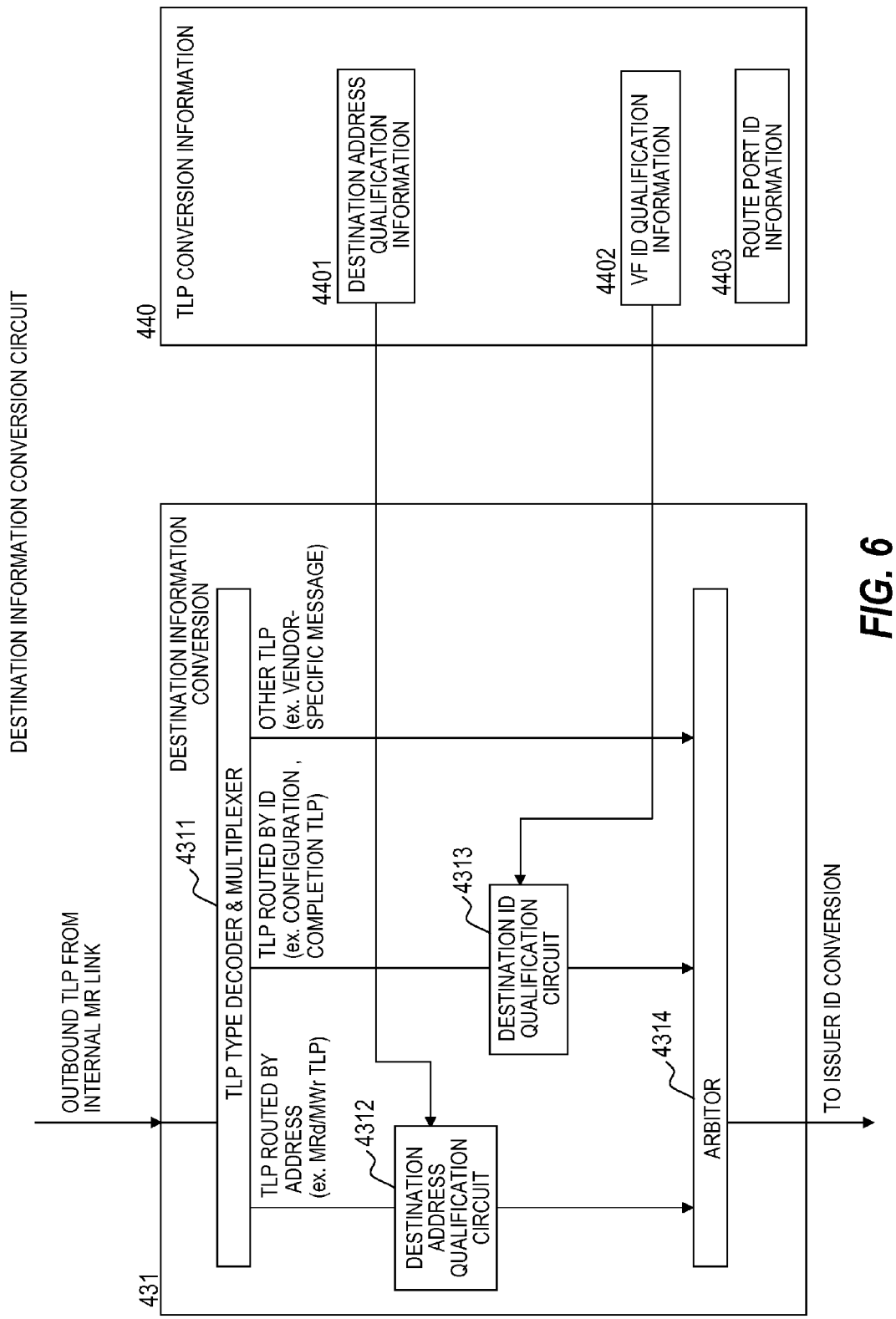
FIG. 6 shows an embodiment of this invention and is a block diagram illustrating the configuration of a destination information conversion circuit in the MR-SR conversion logic.
Figure 8:
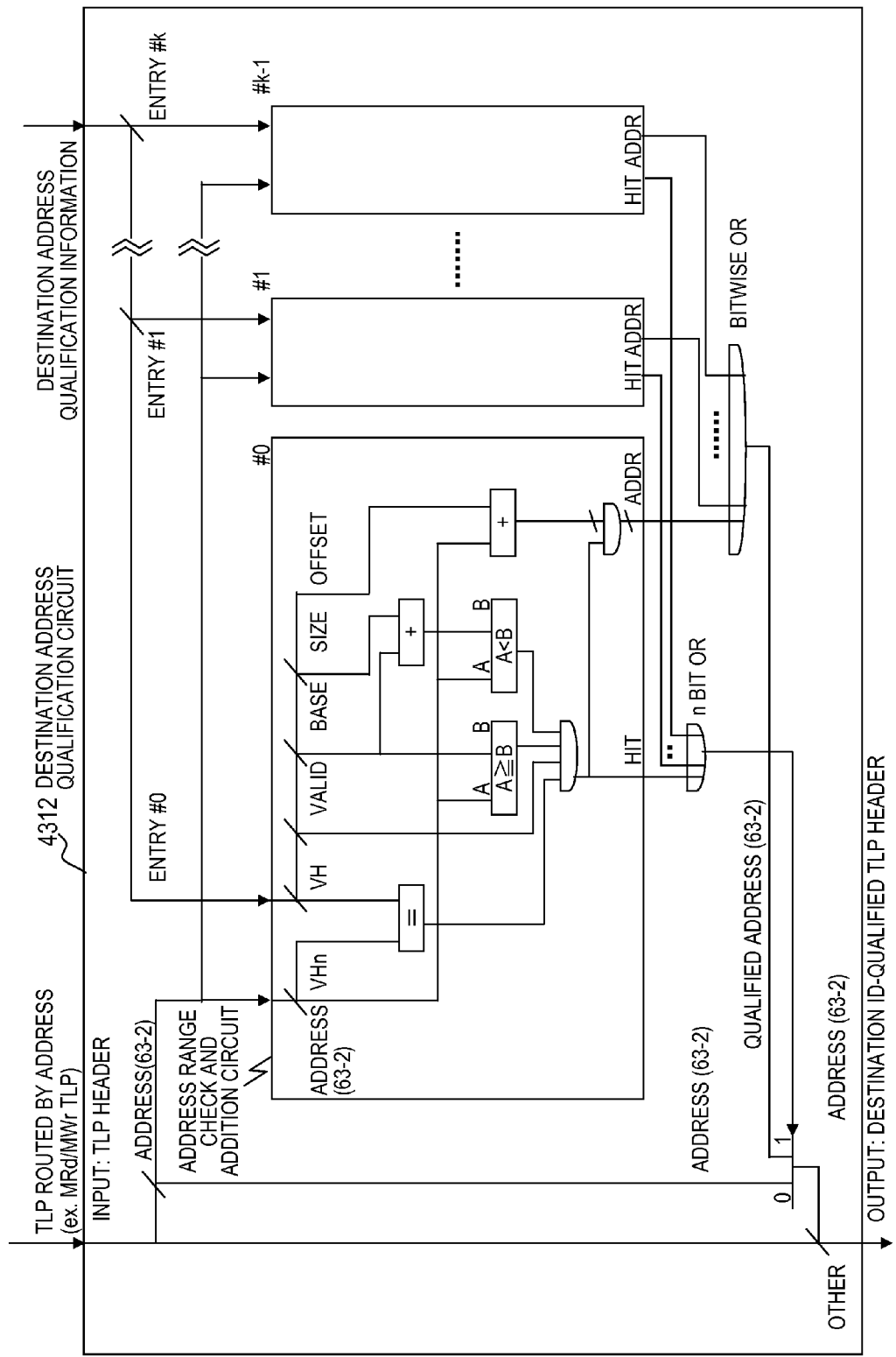
FIG. 8 shows an embodiment of this invention and is a block diagram illustrating the configuration of a destination address qualification module, which is a component of the destination information conversion unit illustrated in FIG. 6.
Figure 9:
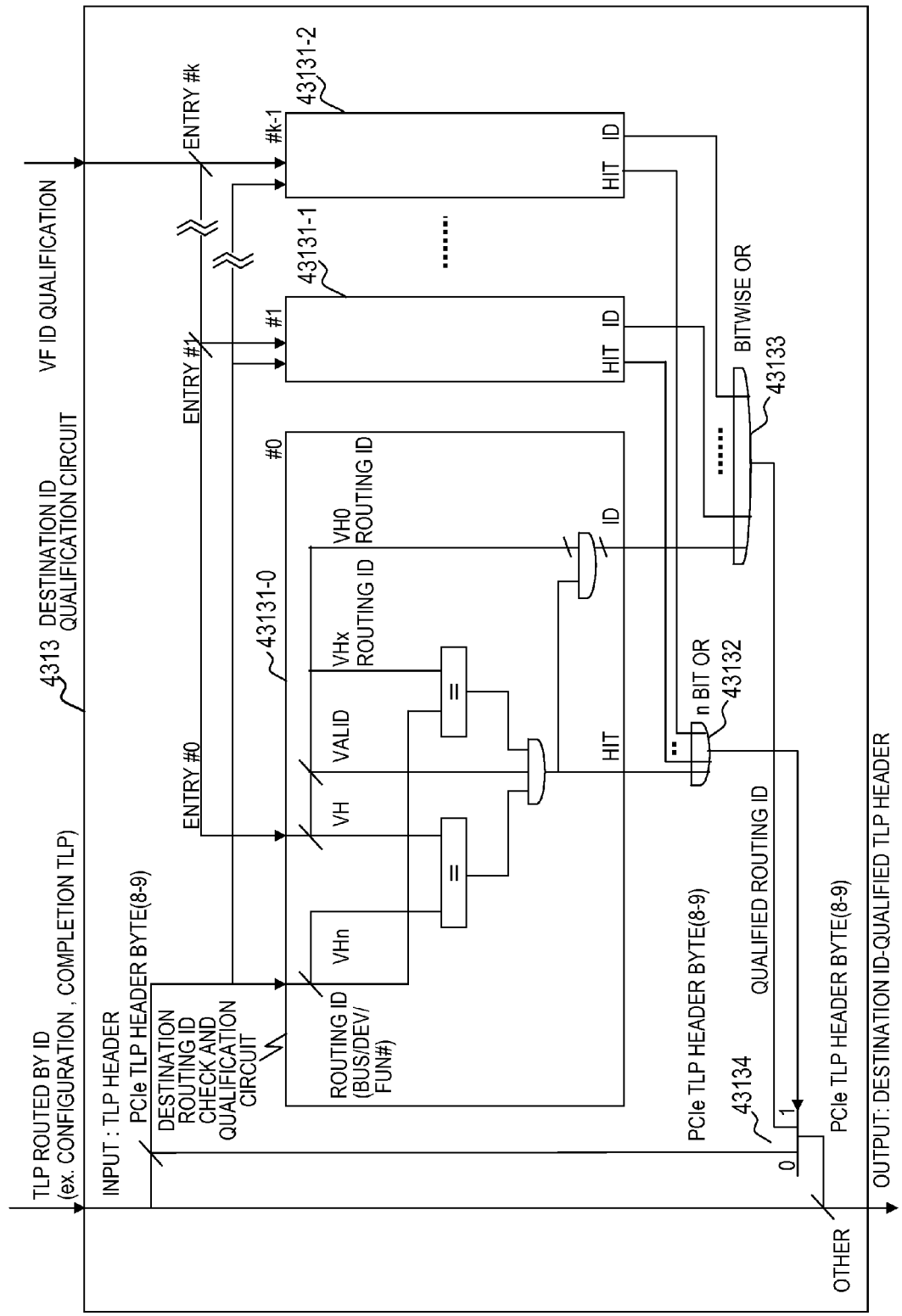
FIG. 9 shows an embodiment of this invention and is a block diagram illustrating the configuration of a destination ID qualification module, which is a component of the destination information conversion unit of FIG. 6.
Figure 10:
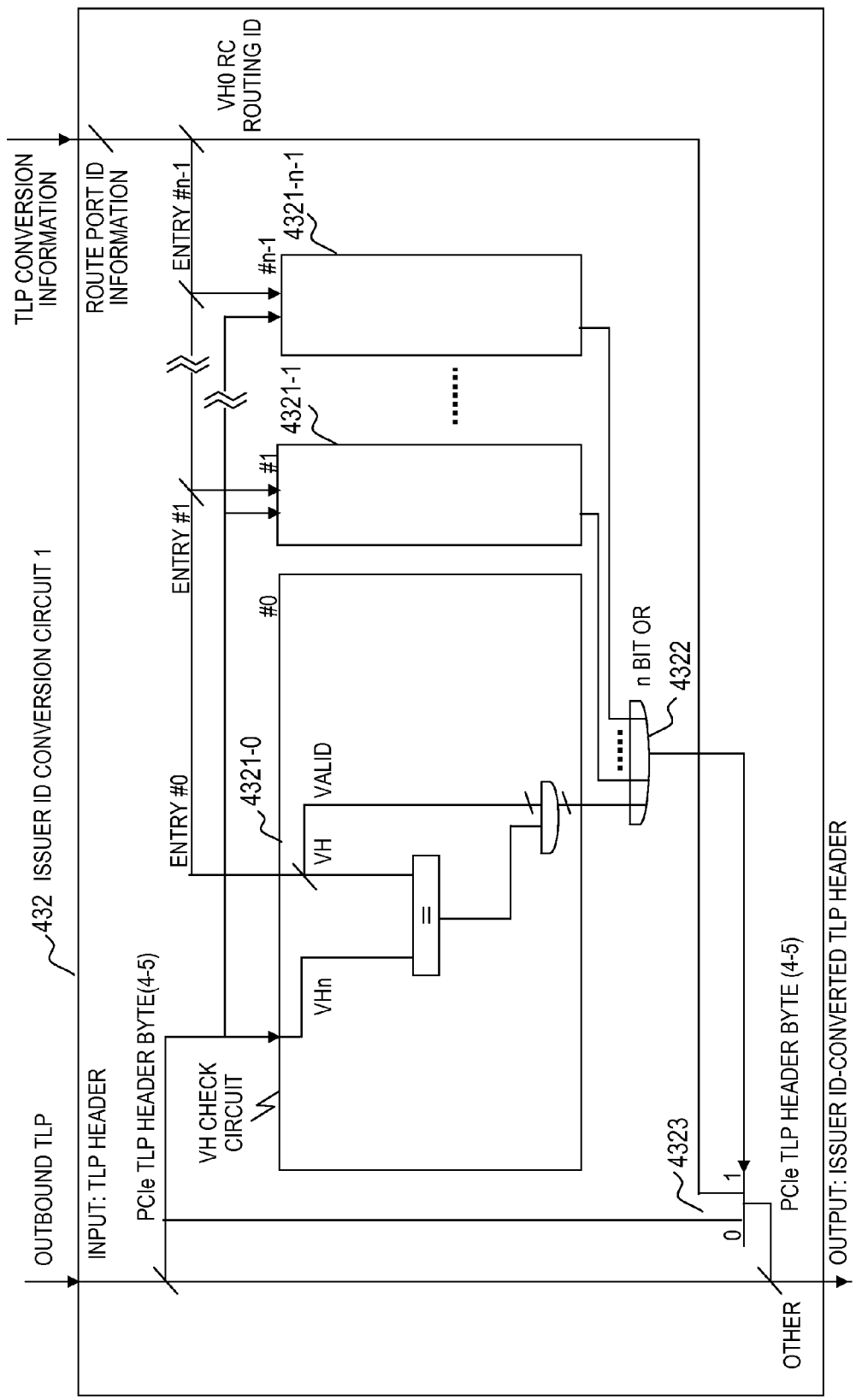
FIG. 10 shows an embodiment of this invention and is a block diagram illustrating the configuration of the unit 432, which is an issuer ID conversion unit 1.
Figure 11:
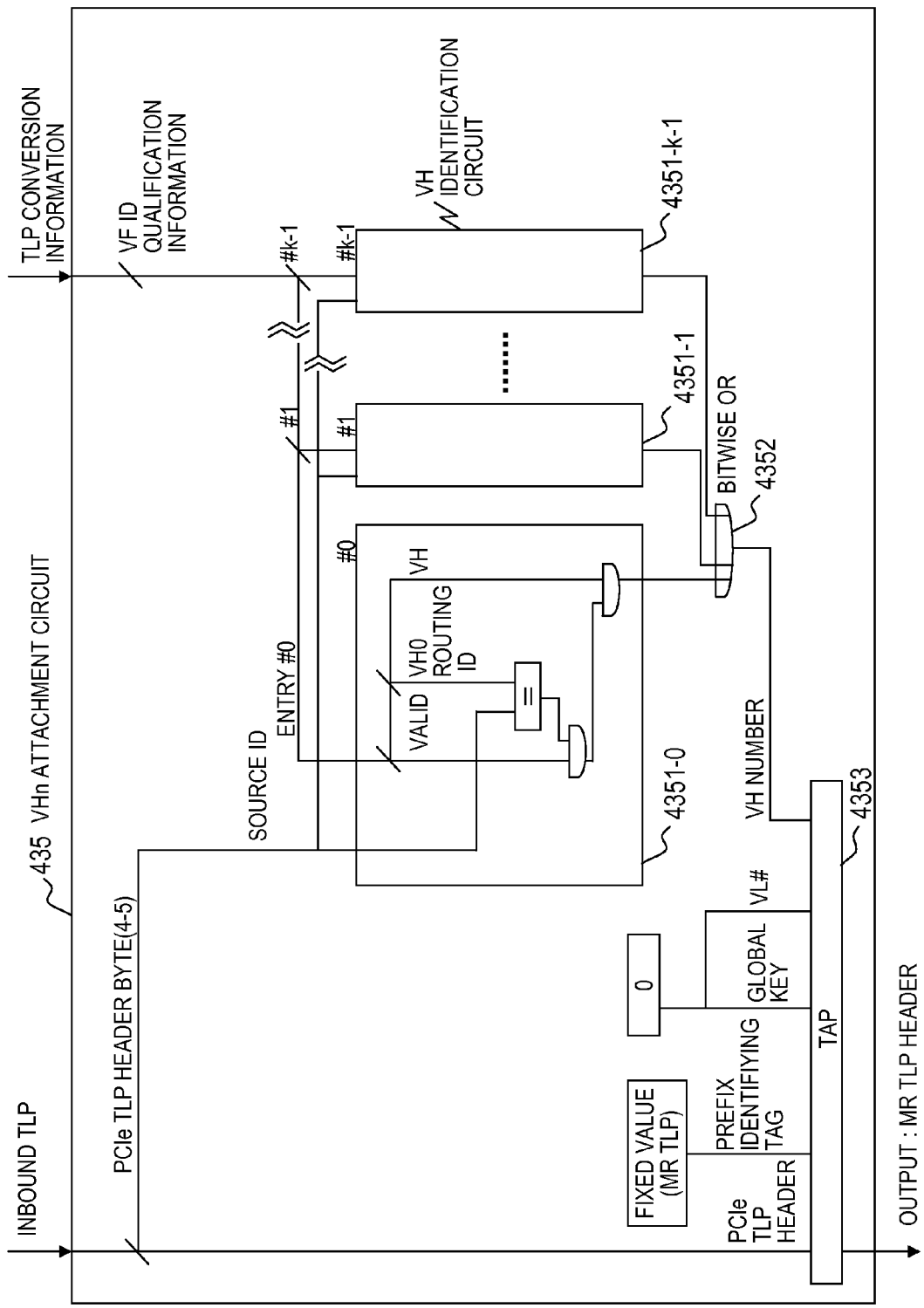
FIG. 11 shows an embodiment of this invention and is a block diagram illustrating the configuration of the virtual hierarchy number attachment unit 435.
Figure 12:
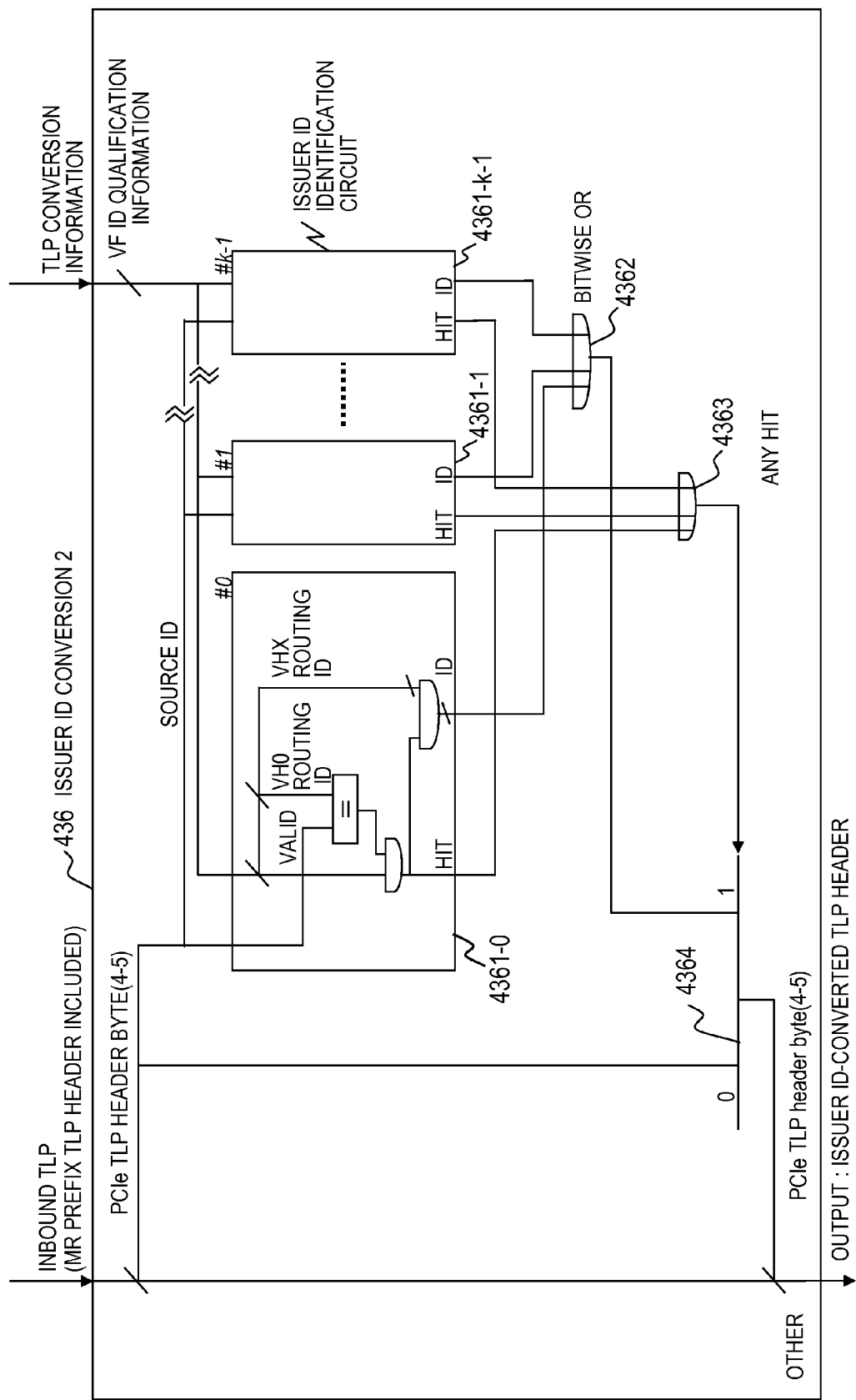
FIG. 12 shows an embodiment of this invention and is a block diagram illustrating the configuration of the unit 436, which is an issuer ID conversion unit 2.
Figure 13:
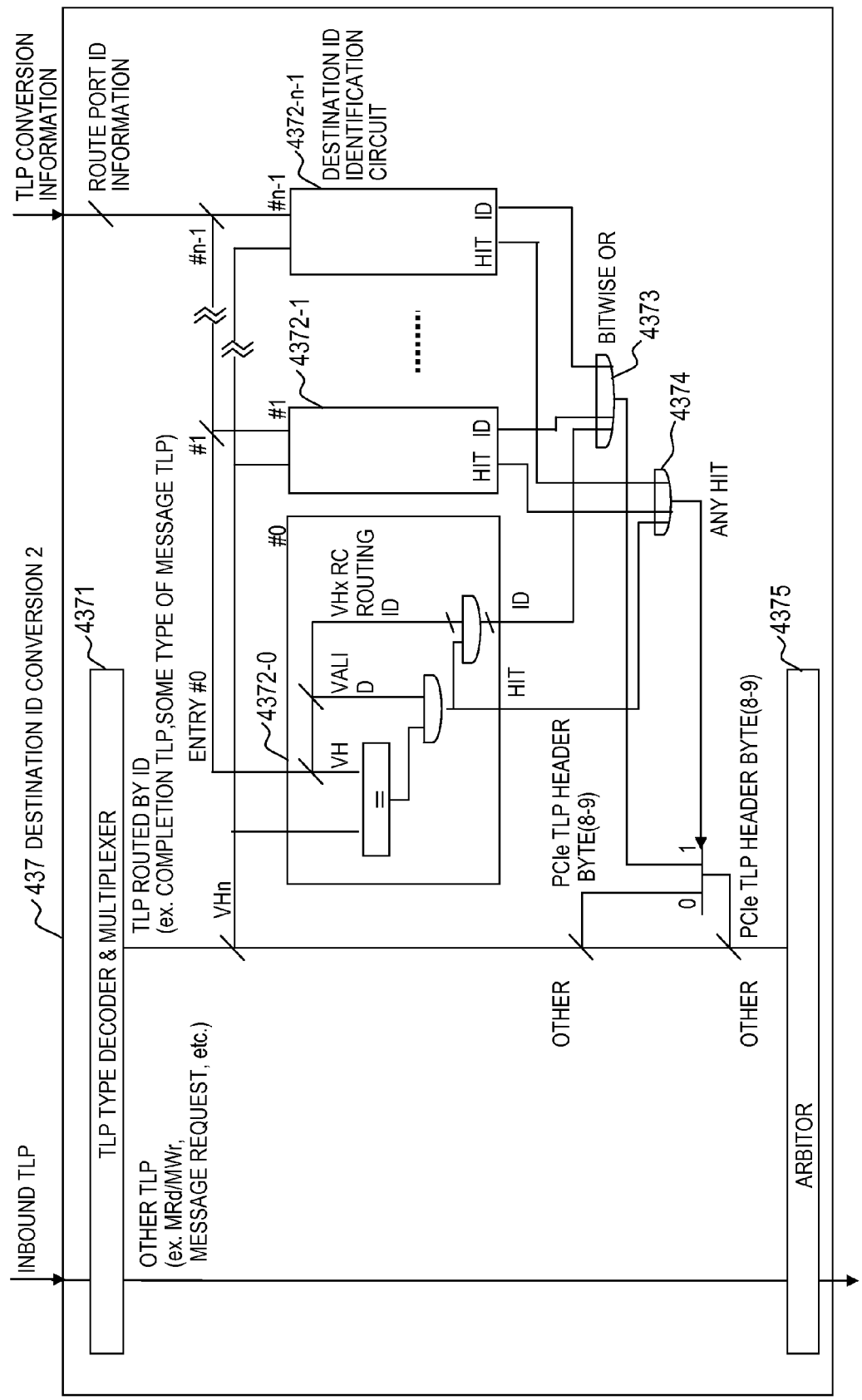
FIG. 13 shows an embodiment of this invention and is a block diagram illustrating the configuration of the unit 437, which is a destination ID conversion unit 2.

The MR-SR conversion logic 430 mainly includes units 431 to 434, which convert MR-IOV packets received from the internal multi-root link 420 into SR-IOV packets to send the SR-IOV packets to the I/O device 50 from the downstream port 42-1, units 435 to 438, which convert SR-IOV packets received from the I/O device 50 via the downstream port 42-1 into MR-IOV packets to send the MR-IOV packets to the internal multi-root link 420, and transaction layer packet (TLP) conversion information 440, which holds information for executing conversion between an MR-IOV packet and an SR-IOV packet. An example of the units 431 to 434 is illustrated in FIGS. 6 and 8 to 13. FIG. 6 is a block diagram illustrating the configuration of the destination information conversion unit 431 of the MR-SR conversion logic 430. FIG. 8 is a block diagram illustrating the configuration of a destination address qualification module, which is a component of the destination information conversion unit illustrated in FIG. 6. FIG. 9 is a block diagram illustrating the configuration of a destination ID qualification module, which is a component of the destination information conversion unit of FIG. 6. FIG. 10 is a block diagram illustrating the configuration of the unit 432, which is an issuer ID conversion unit 1. FIG. 11 is a block diagram illustrating the configuration of the virtual hierarchy number attachment unit 435. FIG. 12 is a block diagram illustrating the configuration of the unit 436, which is an issuer ID conversion unit 2. FIG. 13 is a block diagram illustrating the configuration of the unit 437, which is a destination ID conversion unit 2.

Figure 14:
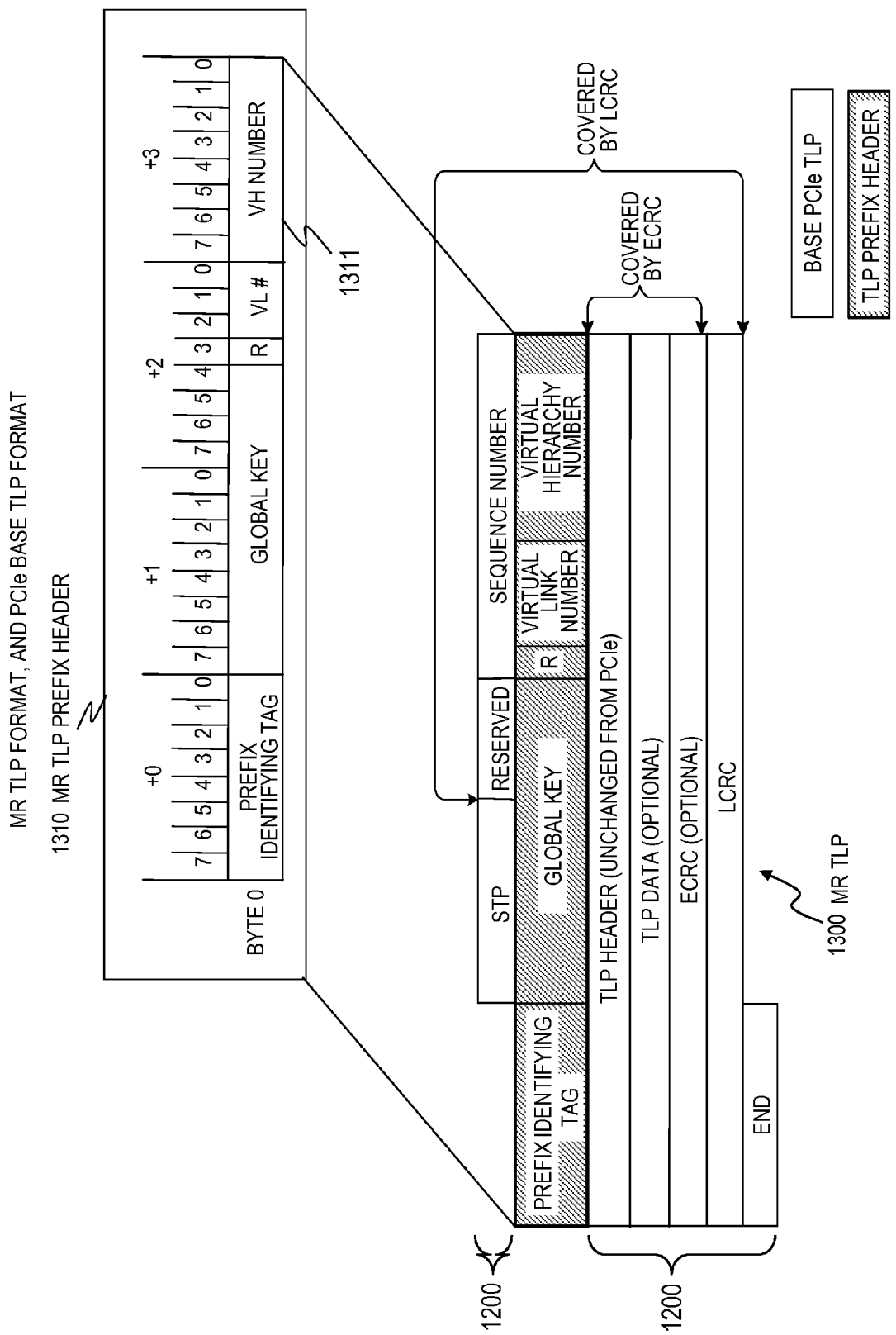
FIG. 14 shows an embodiment of this invention and is an explanatory diagram illustrating a multi-root TLP format and a PCI Express base TLP format.

Now, a packet structure according to this invention is described. FIG. 14 is an explanatory diagram illustrating a multi-root TLP format and a PCI Express (PCIe) base TLP format.

A multi-root TLP (MR TLP of FIG. 14) 1300 is obtained by attaching a multi-root TLP prefix header 1310 in front of the header of a PCIe base TLP 1200, which is a PCI Express packet.

The PCIe base TLP 1200 includes a start frame (STP of FIG. 14), a sequence number, end-to-end cyclic redundancy check (ECRC), link cyclic redundancy check (LCRC), and an end frame.

The multi-root TLP 1300 has the multi-root TLP prefix header 1310 inserted between the sequence number and TLP header of the PCIe base TLP 1200.

The multi-root TLP prefix header 1310 contains a virtual hierarchy number (VHn) 1311 for identifying which of the blades 10-1 to 10-*n* has issued a PCIe packet in MR-IOV. The virtual hierarchy number 1311 in this embodiment is an identification number assigned within the PCI-e switch 40, and is stored in the MRS configuration information 415.

In the blade server 1 of this invention, the virtual machines 101-0 to 101-*k*-1, the virtual machine monitors 100-1 to 100-*n*, the chip sets 13-1 to 13-*n*, and the upstream ports 41-1 to 41-*n* exchange data in the multi-root TLP 1300, which is an MR-IOV packet, with one another, whereas the downstream port 42-1 and the I/O device 50 exchange data in the PCIe base TLP 1200 by removing the multi-root TLP prefix header 1310 from the multi-root TLP 1300.

The blade server 1 of this invention uses the MR-SR conversion logic 430 of the PCI-e switch 40 to convert the multi-root TLP 1300 into the PCIe base TLP 1200 by removing the multi-root TLP prefix header 1310 and changing the sender to the PCI management server 20. The PCIe base TLP 1200 is then sent to the I/O device 50 as an outbound packet, which travels in a direction from the blades 10-1 to 10-*n* toward the I/O device 50.

A conversion reverse to this is performed on a packet that travels from the I/O device 50 toward the blades 10-1 to 10-*n*, namely, an inbound packet. The MR-SR conversion logic 430 of the PCI-e switch 40 attaches the multi-root TLP prefix header 1310 which has been attached to an outbound packet and which includes the virtual hierarchy number 1311 to the PCIe base TLP 1200 received from the I/O device 50, and then sends the resultant packet to the blades 10-1 to 10*n*.

With the above-mentioned configuration, using MR-IOV packets for communication on the side of the blades 10-1 to 10-*n* of the PCI-e switch 40 while using SR-IOV packets for communication on the side of the I/O device 50 of the PCI-e switch 40 allows the plurality of blades 10-1 to 10-*n* to share the single I/O device 50 compliant with SR-IOV.

The PCI-e switch 40 conceals, from the I/O device 50, which one of the blades 10-1 to 10-*n* is the issuer and, in addition, absorbs memory-mapped I/O (MMIO) spaces which are allocated to the blades 10-1 to 10-*n* such that different blades are given different MMIO spaces.

To this end, when the virtual machine monitors 100-1 to 100-*n* are activated, the PCI management server 20 stores, in the TLP conversion information 440 of the PCI-e switch 40, a difference (offset) between the respective MMIO space addresses of the virtual computers 101-0 to 101-*k*-1 and the MMIO space of the PCI management server 20, which is treated as the issuer of the PCIe base TLP 1200 destined to the I/O device 50. The stored difference is used to convert the destination address of the inbound multi-root TLP 1300 into the MMIO space of one of the virtual machine monitors 100-1 to 100-*n* that is the actual destination.

A detailed description is given below of the removal and attachment of the virtual hierarchy number 1311 and the destination address conversion which are performed by the PCI-e switch 40.

Figure 4:
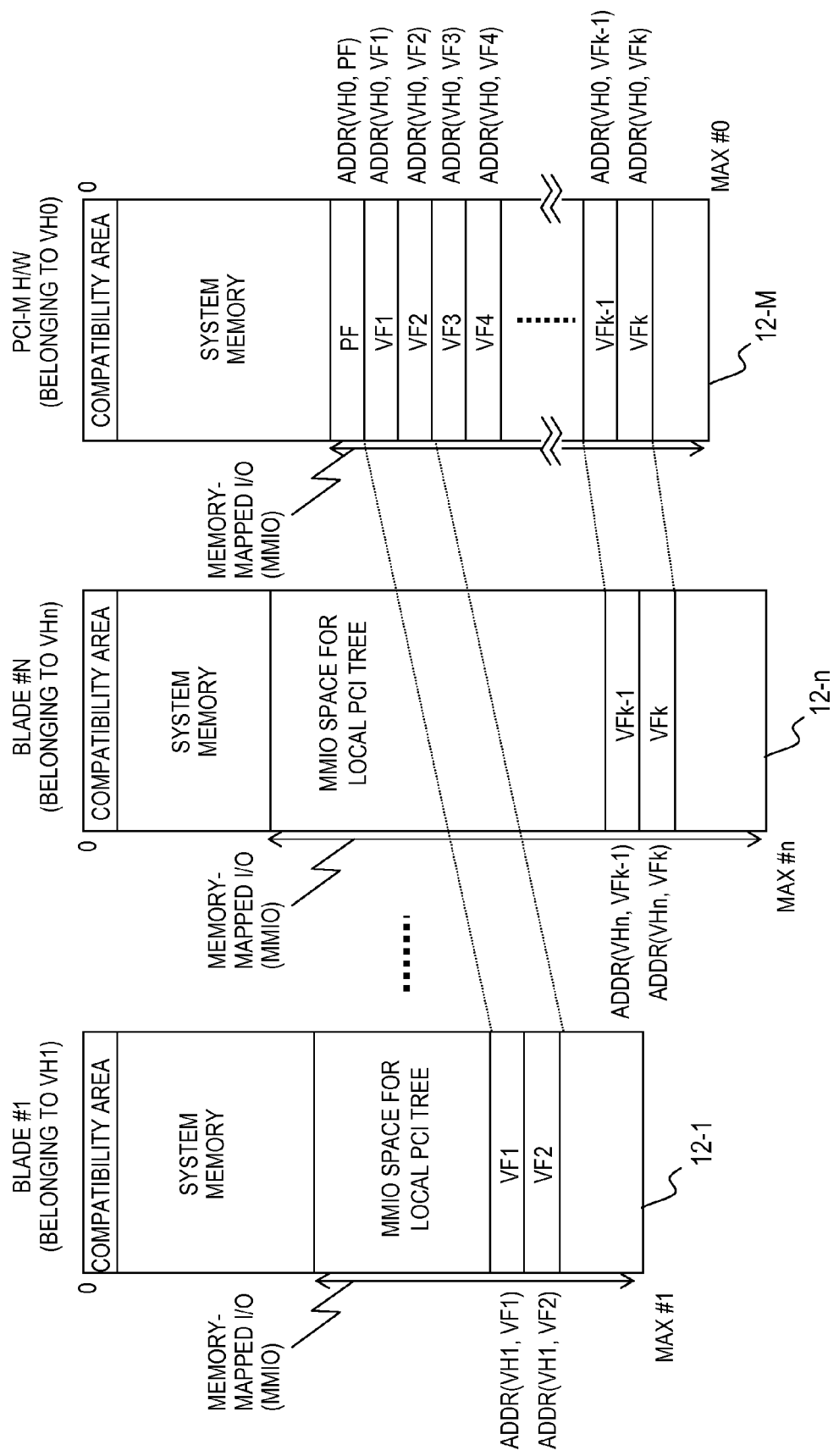
FIG. 4 shows an embodiment of this invention and is MMIO spaces set in the memories 12-1 to 12-n and 12-M, which are managed by the blade 10-1 (Blade #1) to the blade 10-n (Blade #n) and the PCI management server 20.

FIG. 4 illustrates MMIO spaces set in the memories 12-1 to 12-*n* and 12-M, which are managed by the blade 10-1 (Blade #1) to the blade 10*n* (Blade #n) and the PCI management server 20 (PCI-M). In the example of FIG. 4, two virtual functions 502 "VF1 and VF2" are allocated to the blade 10-1, and two virtual functions 502 "VFk-1 and VFk" are allocated to the blade 10*n*.

The virtual machine monitors 100-1 to 100-*n* of the blades 10-1 to 10-*n* set MMIO spaces for accessing the virtual functions 502 (VF) of the I/O device 50 behind their local PCI trees. The MMIO space address of one blade differs from that of another blade due to, for example, a difference in capacity among the memories 12-1 to 12-*n* mounted to the blades 10-1 to 10-*n*. Each of the blades 10-1 to 10-*n* is allocated with an MMIO space, which is set in the memory 12-M by the PCI management server 20, for each virtual function 502 (VF) that the blade uses.

A difference in the addresses of MMIO spaces used by the blades 10-1 to 10-*n* is set in an "offset" field of destination address qualification information 4401, which is set by the PCI manager 202. This enables the PCI-e switch 40 to change the destination address of a packet sent between the I/O device 50 and the blades 10-1 to 10*n*.

Specifically, in the case of a read request or the like sent from one of the blades 10-1 to 10-$n$ to the I/O device 50, the PCI-e switch 40 uses the "offset" value of the destination address qualification information 4401 to rewrite the issuer address of the packet sent from the blade with an MMIO space in the PCI management server 20, and sends the packet that now has the MMIO space as the issuer address to the I/O device 50.

In the case of a response of the I/O device 50 to a read request or the like made by one of the blades 10-1 to 10-$n$, on the other hand, the I/O device 50 sends a packet whose destination address is an MMIO space in the PCI management server 20, and the PCI-e switch 40 uses the "offset" value of the destination address qualification information 4401 to rewrite the MMIO space in the PCI management server 20 with an MMIO space allocated to the blade in question, before sending the response.

Through the above-mentioned processing, the PCI-e switch 40 switches MMIO space addresses and thus enables the plurality of blades 10-1 to 10-$n$ to share the I/O device 50 compliant with SR-IOV.

Figure 5:
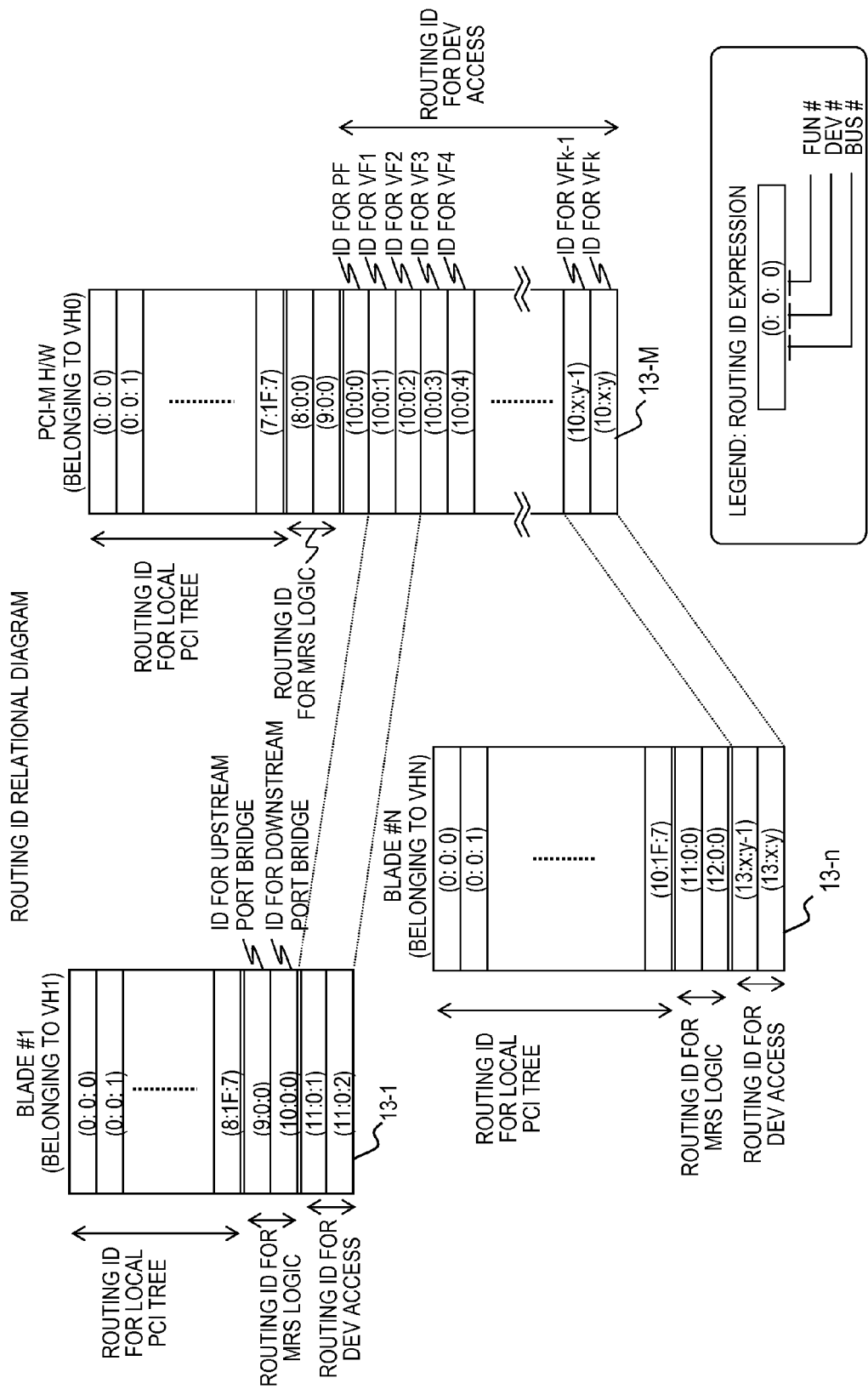
FIG. 5 shows an embodiment of this invention and is relations of routing IDs managed by the chip sets 13-1 to 13-n and 13-M which are managed by the blades 10-1 (Blade #1) to the blade 10-n (Blade #n) and by the PCI management server 20 (PCI-M).

FIG. 5 illustrates relations of routing IDs managed by the chip sets 13-1 to 13-$n$ and 13-M which are managed by the blades 10-1 (Blade #1) to the blade 10-$n$ (Blade #$n$) and by the PCI management server 20 (PCI-M). The chip sets 13-1 to 13-$n$ and 13-M each have routing IDs for a local PCI tree, where devices within its own computer are recognized, routing IDs for MRS logic, which are obtained from the MRS logic 410 of the PCI-e switch 40, and routing IDs for access from the chip sets 13-1 to 13-$n$ and 13-M to the I/O device 50.

The chip sets 13-1 to 13-$n$ of the blades 10-1 to 10-$n$ are coupled to the upstream ports 41-1 to 41-$n$ of the PCI-e switch 40 such that no two chip sets 13 are coupled to the same upstream port 41. Therefore, the chip sets 13-1 to 13-$n$ each recognizes a different number as the bus number of the I/O device 50. In the example of FIG. 5, the blade 10-1 is allocated with two virtual functions 502 "VF1 and VF2," and the blade 10-$n$ is allocated with two virtual functions 502 "VFk-1 and VFk."

From the chip set 13-1 to the virtual function 502 "VF1" of the I/O device 50, the routing ID is "11:0:1" and the bus number is "11" whereas, from the chip set 13-$n$ to the virtual function 502 "VFk-1" of the I/O device 50, the routing ID is "13:x:y-1" and the bus number is "13." Similarly, the blades 10-1 to 10-$n$ are given routing IDs for MRS logic such that different blades have different routing IDs for MRS logic. A routing ID is expressed as "bus number (Bus #): device number (Dev #): function number (Fun #)" set in the order stated.

On the other hand, the PCI manager 202 which can access the physical function 501 of the I/O device 50 initializes, when activated, the routing IDs of the physical function 501 and the virtual functions 502, and manages the initialized routing IDs in the chip set 13-M. In the example of FIG. 5, routing IDs "10:0:0" to "10:x:y-1" are set as routing IDs for access to the I/O device 50.

Figure 7:
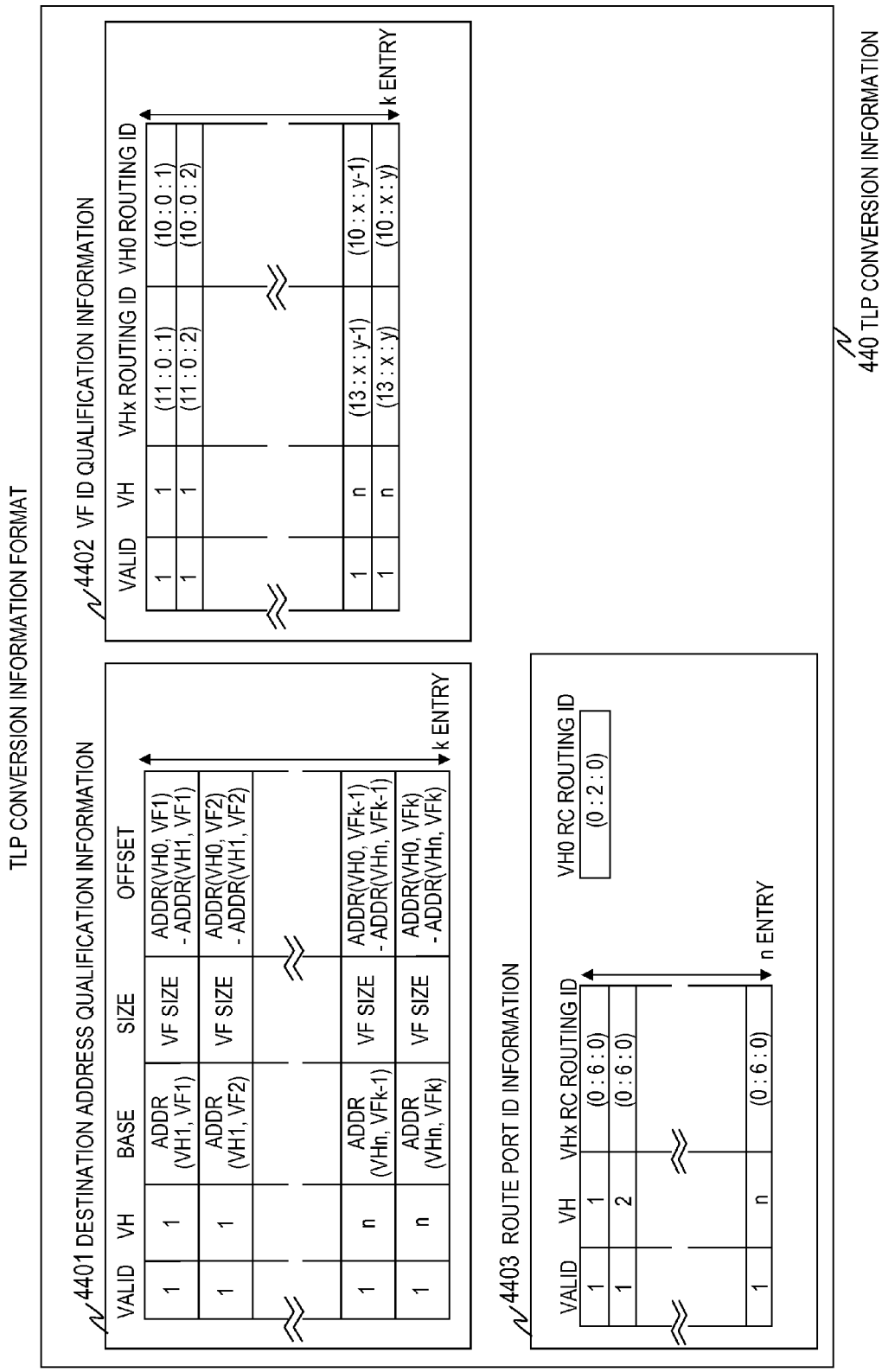
FIG. 7 shows an embodiment of this invention and is an explanatory diagram illustrating the configuration of the TLP information.

Each time the blades 10-1 to 10-$n$ are activated, the PCI manager 202 sets routing IDs of routing from the respective chip sets 13-1 to 13-$n$ of the blades 10-1 to 10-$n$ to the virtual functions 502 of the I/O device 50, and routing IDs of the I/O device 50 which are managed by the chip set 13-M of the PCI management server 20, in virtual function ID qualification information 4402 of the TLP conversion information 440 which is illustrated in FIGS. 6 and 7, together with the virtual hierarchy number 1311 which is assigned to each of the blades 10-1 to 10-$n$ separately. FIG. 6 is a block diagram illustrating the configuration of a destination information conversion circuit in the MR-SR conversion logic. FIG. 7 is an explanatory diagram illustrating the configuration of the TLP information.

When the blades 10-1 to 10-$n$ and the I/O device 50 use routing IDs to make access, the PCI-e switch 40 refers to the virtual function ID qualification information 4402 to switch routing IDs in the packet, and communication is executed with the use of this packet.

In other words, when packets from the blades 10-1 to 10-$n$ access the I/O device 50 with the use of routing IDs, the PCI-e switch 40 replaces the routing IDs of the blades 10-1 to 10-$n$ with the routing IDs of the PCI management server 20, and then sends the packets to the I/O device 50.

On the contrary, when packets from the I/O device 50 access the blades 10-1 to 10-$n$ with the use of routing IDs, the PCI-e switch 40 replaces the routing IDs of the PCI management server 20 with the routing IDs of the blades 10-1 to 10-$n$, and then sends the packets to the I/O device 50.

Through the above-mentioned processing, the PCI-e switch 40 switches the routing IDs, thereby enabling the plurality of blades 10-1 to 10-$n$ to share the I/O device 50 compliant with SR-IOV.

Figure 15A:
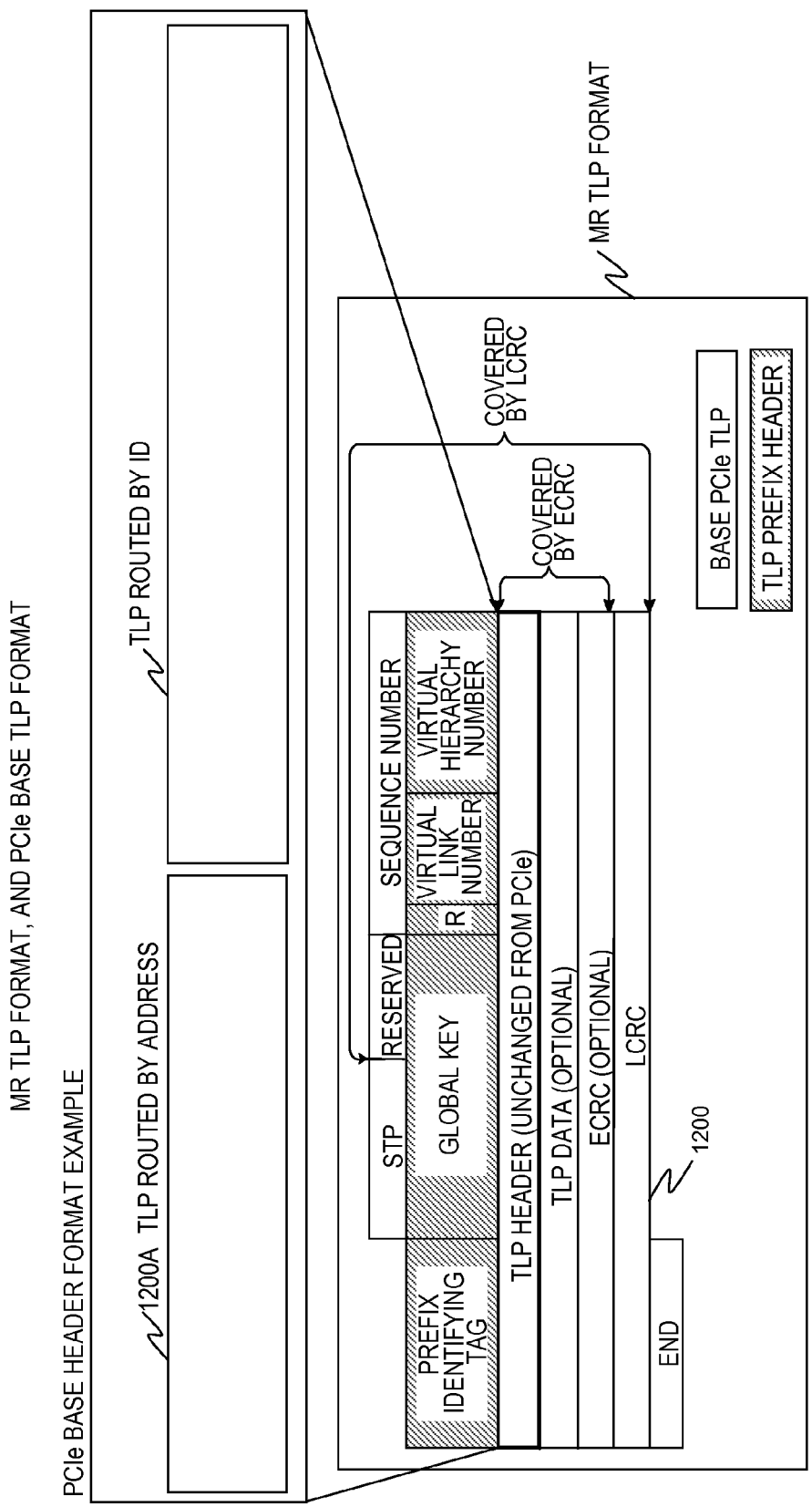
FIG. 15A shows an embodiment of this invention and is an explanatory diagram illustrating a TLP header out of the components of the PCIe base TLP 1200, which is transferred by the PCI-e switch 40.
Figure 15B:
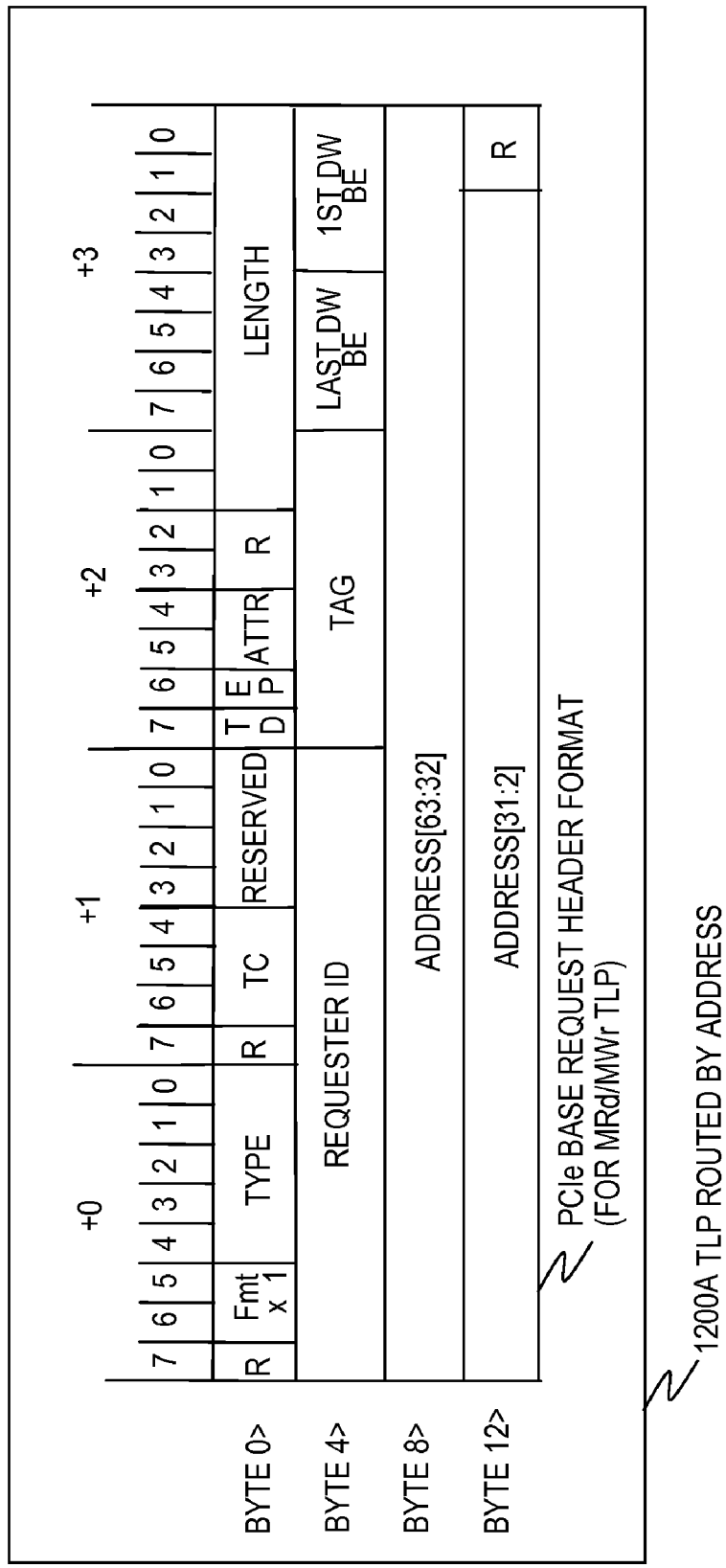
FIG. 15B shows an embodiment of this invention and is an explanatory diagram illustrating a TLP header out of the components of the PCIe base TLP 1200.
Figure 15C:
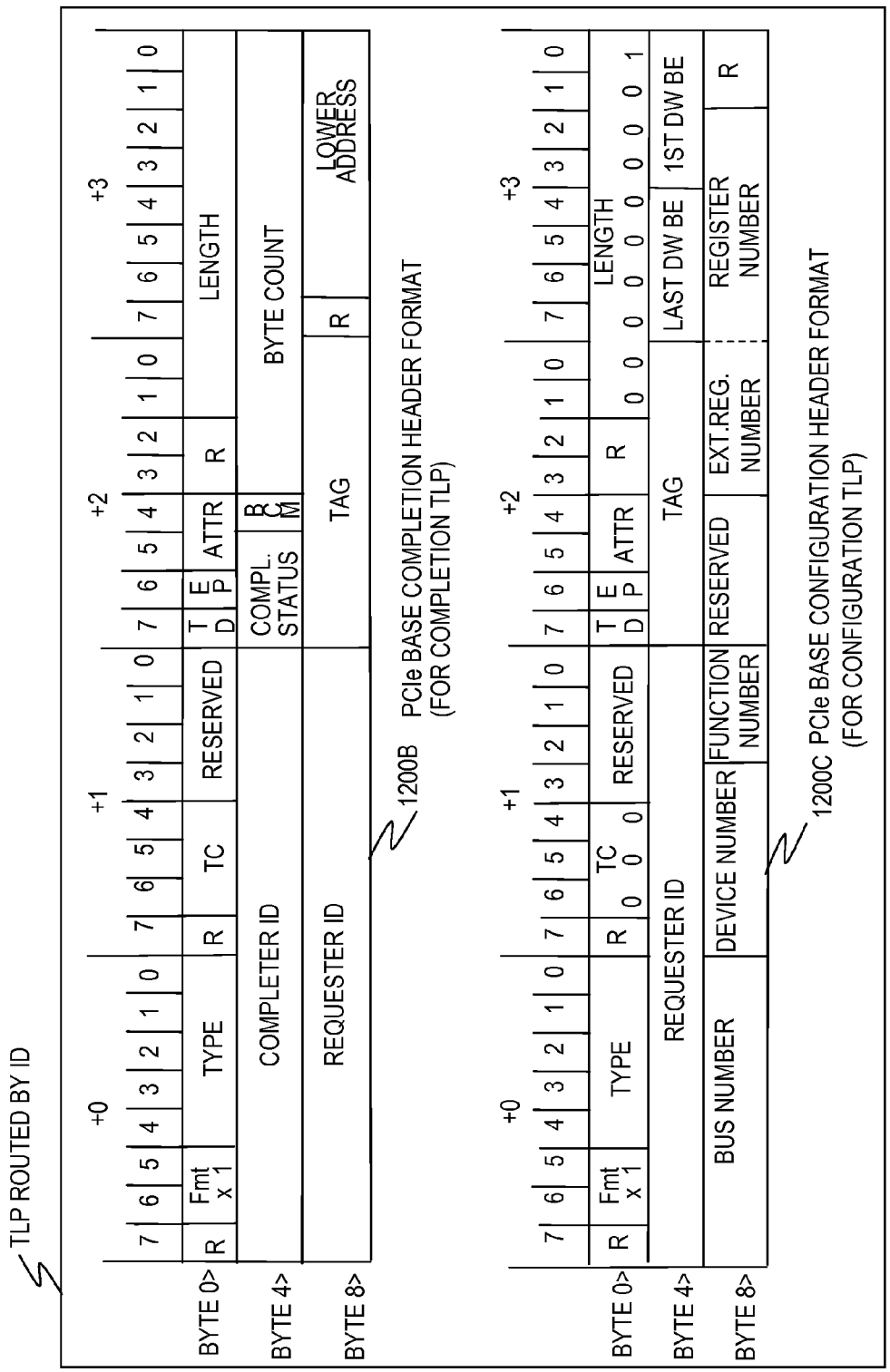
FIG. 15C shows an embodiment of this invention and is an explanatory diagram illustrating a TLP header out of the components of the PCIe base TLP 1200.

The format of a PCI Express packet that is used in the blade server 1 is illustrated in FIG. 15. FIG. 15 is an explanatory diagram illustrating a TLP header out of the components of the PCIe base TLP 1200, which is transferred by the PCI-e switch 40. FIG. 15 illustrates different TLP headers for different access modes.

In FIG. 15 where TLP headers of the PCIe base TLP 1200 are illustrated in detail, a TLP header 1200A indicates a packet that uses an MMIO space address for access between the blades 10-1 to 10-$n$ and the I/O device 50. TLP headers 1200B and 1200C indicate packets that use routing IDs to access. The TLP header 1200B shows an example of a packet for notifying the fulfillment of a request (read request or the like) and serving as a completion notification. The TLP header 1200C shows an example of a packet for setting configuration information (configuration) of a target device. The TLP headers 1200A to 1200C are each made up of sixteen bytes: bytes 0 to 15.

The TLP header 1200A which uses an MMIO space address to make access is employed in memory read requests and memory write requests.

The TLP header 1200A stores in the bytes 4 and 5 the routing ID of the requester as the ID of the packet's issuer (requester), stores in the bytes 8 to 15 the address of an MMIO space to be read, and stores in bits 0 to 4 of the byte 0 the type of the request.

In the case of an outbound packet traveling from one of the blades 10-1 to 10-$n$ to the I/O device 50, the PCI-e switch 40 rewrites the routing ID of the blade that is stored as the requester ID with the routing ID of the PCI management server 20, to thereby set the PCI management server 20 as the requester. The issuer of a packet ID destined to the I/O device 50 is switched to the PCI management server 20 because the I/O device 50 which is compliant with SR-IOV is coupled to only one computer.

The PCI-e switch 40 then uses the "offset" value of the destination address qualification information 4401 to change the MMIO space address of the blade into the MMIO space address of the PCI management server 20 (PCI manager 202), namely, an address space recognizable to the I/O device 50.

The TLP header 1200B which uses a routing ID to make access is employed in a completion notification for notifying the fulfillment of a request (write request or the like). The TLP header 1200B stores in the bytes 4 and 5 the routing ID of a device that issues a completion notification (completion) as a completer ID, stores in the bytes 8 and 9 the routing ID of the requester as a requester ID, and stores in the bits 0 to 4 of the byte 0 a value that indicates completion.

The PCI-e switch 40 refers to the virtual function ID qualification information 4402 and, in the case of an inbound packet traveling from the I/O device 50, sends the packet after replacing the routing ID of the PCI management server 20 which is stored as the requester ID with the routing ID of the destination blade.

The TLP header 1200C which uses a routing ID to make access is employed in a packet that requests to set configuration information in a device. The TLP header 1200C stores, in the bytes 4 and 5, as a requester ID, the routing ID of a device requested to set configuration information, stores in the bytes 8 and 9 a routing ID that includes the bus number, the device number, and the function number of a target in which configuration information is to be set, and stores in the bits 0 to 4 of the byte 0 a value that indicates a configuration information setting request (configuration).

In the case of an outbound packet traveling from one of the blades 10-1 to 10-n to the I/O device 50, the PCI-e switch 40 rewrites the routing ID of the blade that is stored as the requester ID with the routing ID of the PCI management server 20, to thereby set the PCI management server 20 as the requester. The PCI-e switch 40 also refers to the virtual function ID qualification information 4402 to replace the routing ID (bus number, device number, and function number) of the I/O device 50 that has been set by the blade with a routing ID that the PCI management server 20 recognizes. This changes the packet such that the I/O device 50 regards this packet as a request from the PCI management server 20.

Figure 16:
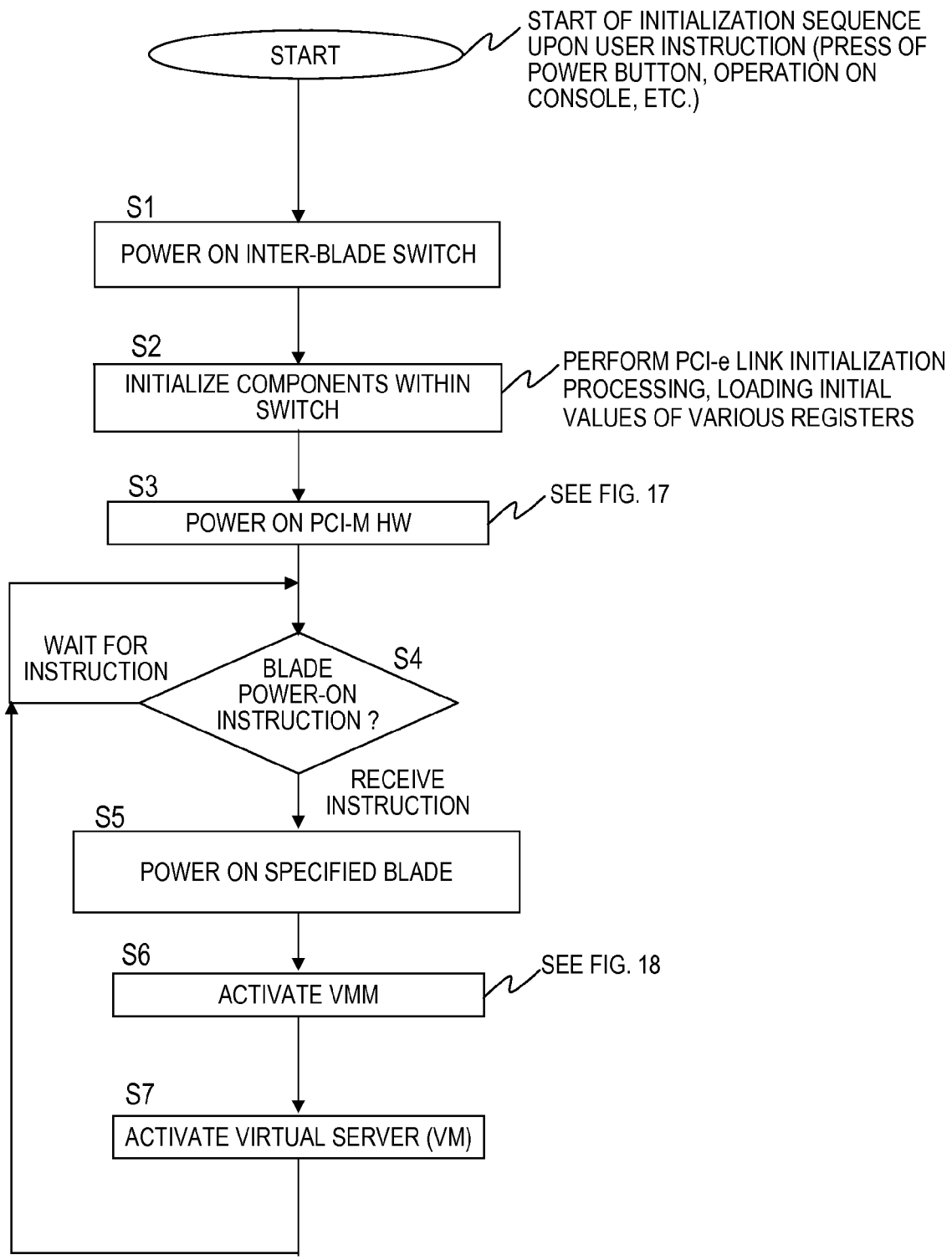
FIG. 16 shows an embodiment of this invention and is a flow chart illustrating steps of activating the blade server 1.

FIG. 16 is a flow chart illustrating steps of activating the blade server 1. This processing is started in response to the manipulation of a switch by an administrator or user of the blade server 1.

In Step S1, the administrator (or user) powers on the PCI-e switch 40. Once activated, the PCI-e switch 40 executes processing of initializing a PCI-e link and processing of initializing various registers (S2). In other words, the MRS configuration information 415 and the TLP conversion information 440 of FIG. 3 are initialized. The I/O device 50 is also powered on by the administrator or others. The powering on of the I/O device 50 may be in conjunction with the powering on of the PCI-e switch 40.

In Step S3, the administrator (or user) powers on the PCI management server 20. The PCI management server 20 performs initialization of various components as is described later with reference to FIG. 17. After the PCI management server 20 finishes booting up, the PCI manager 202 waits in Step S4 for an instruction to activate a blade which is given from the administration terminal 30.

The PCI manager 202 receives from the administration terminal 30 an instruction to activate one of the blades 10-1 to 10-n, and then proceeds to Step S5, where the one of the blades 10-1 to 10-n that is the target of the instruction is powered on. After that, in Step S6, the PCI manager 202 activates one of the virtual machine monitors 100-1 to 100-n that is associated with the blade that has just been activated. Details of the activation of the virtual machine monitors 100-1 to 100-n are described later with reference to FIG. 18. In Step S7, after the activation of the virtual machine monitor is completed, virtual machines selected from 101-0 to 101-k-1 according to the received instruction are created, and relevant OSs selected from 102-0 to 102-k-1 are activated on the created virtual machines selected from 101-0 to 101-k-1. After the activation of the virtual machines is completed, the PCI manager 202 returns to Step S4 to wait for the next instruction to activate another of the blades 10-1 to 10n.

Through the above-mentioned processing, the PCI-e switch 40, the PCI management server 20, and the I/O device 50 are powered on and initialized in the order stated, and then one of the blades 10-1 to 10-n that is designated by the administration terminal 30 is activated.

Figure 17:
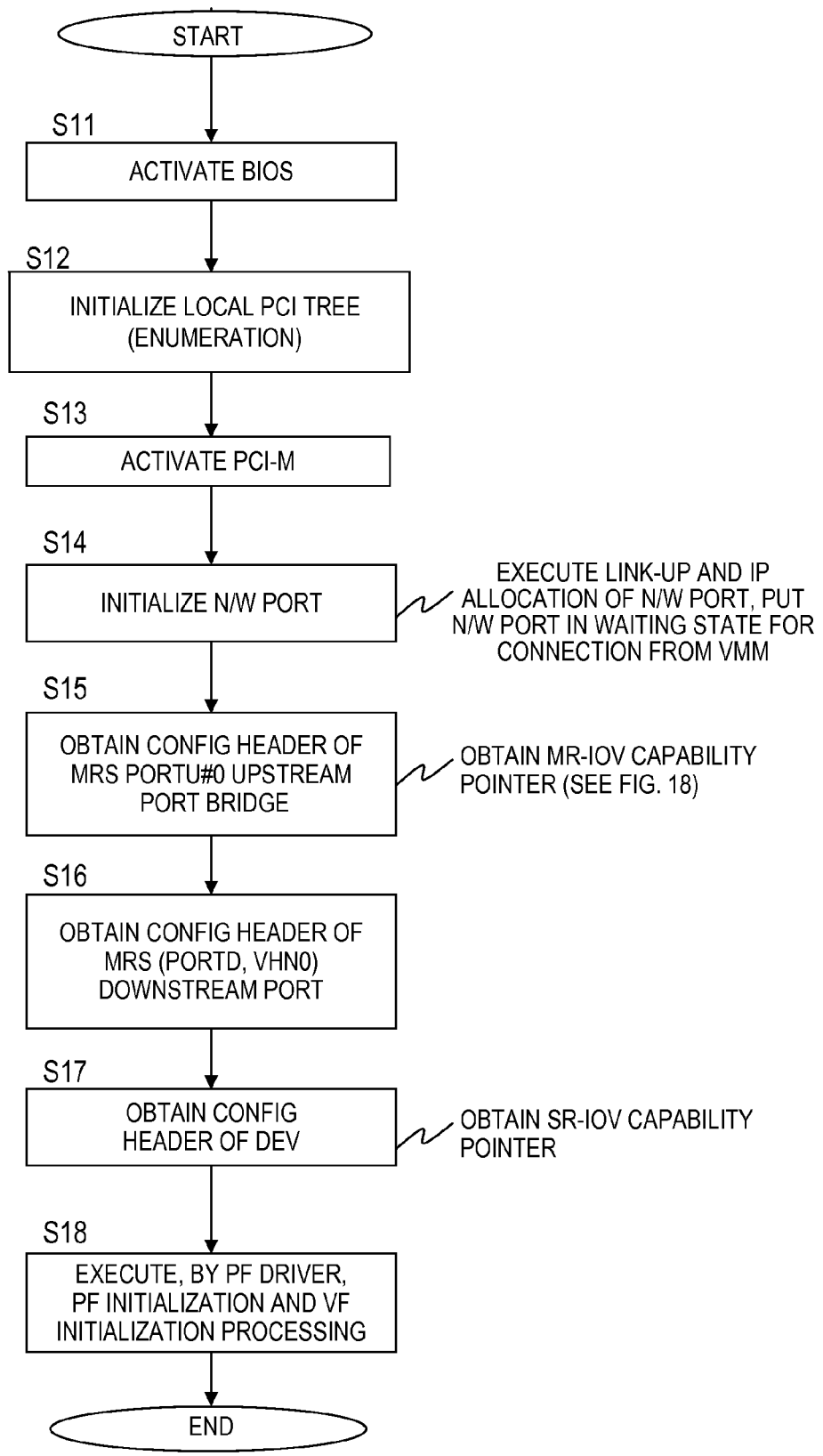
FIG. 17 shows an embodiment of this invention and is a flow chart illustrating an example of processing that is executed when the PCI management server 20 is booted up in Step S3 of FIG. 16.

FIG. 17 is a flow chart illustrating an example of processing that is executed when the PCI management server 20 is booted up in Step S3 of FIG. 16.

When the PCI management server 20 is powered on, a basic I/O system (BIOS) or an extensible firmware interface (EFI) is activated in Step S11. As the BIOS (or EFI) is activated, in Step S12, the chip set 13-M builds a local PCI tree under the root complex from devices within the PCI management server 20, and initializes the local PCI tree. Specifically, the chip set 13-M sets routing IDs for a local PCI tree as those illustrated in FIG. 5 in registers or other given areas in the chip set 13-M. In this example, routing IDs "0:0:0" to "7:1F:7" are set in respective entries as local routing IDs within the PCI management server 20.

In Step S13, after the activation of the BIOS (or EFI) is completed, the OS 201 is activated and then the PCI manager 202 (PCI-M) is activated. At this point, the OS 201 reads the PF driver 203 to prepare for the use of the physical function PF 501 of the I/O device 50 by the PCI manager 202. The physical function of the I/O device 50 is used only by the PCI manager 202, which manages the PCI-e switch 40 and the I/O device 50, and the blades 10-1 to 10-n use virtual functions of the I/O device 50.

In Step S14, the OS 201 initializes the network interface 132-M. The initialization of the network interface 132-M includes logging on to the network 70, assigning an IP address, and starting a wait for connection requests from virtual machines of the blades 10-1 to 10n.

In Step S15, the PCI manager 202 accesses the PCI-e switch 40 through the I/O port 131-M to obtain, from the upstream port bridge 412 of the multi-root switch logic 410, configuration information (for example, an MR-IOV capability pointer) set to the port 411-0, which is coupled to the upstream port 41-0, and obtains the bus number (for example, 9) of the port 411-0. An MR-IOV capability pointer as configuration information is indicated by a VSEC_ID in bits 0 to 15 of the fourth bytes as illustrated in FIG. 19. The PCI manager 202 obtains the virtual hierarchy number 1311 from the PCI-e switch 40. In the example of FIG. 4, the virtual hierarchy number 1311 (VH) of the PCI management server 20 is "0". FIG. 19 is an explanatory diagram illustrating an example of an MR-IOV capability format.

In Step S16, the PCI manager 202 accesses the PCI-e switch 40 through the I/O port 131-M to obtain configuration information (for example, configuration header) of the downstream port bridge 413 of the MRS logic 410.

In Step S17, the PCI manager 202 accesses the I/O device 50 through the I/O port 131-M and the upstream port 41-0 to obtain configuration information (for example, configuration header) about SR-IOV of the I/O device 50. From the configuration information of the I/O device 50, the PCI manager 202 obtains the count of virtual functions (VFs) and MMIO spaces. The PCI manager 202 also obtains a bus number and a device number from the I/O device 50. For example, a routing ID for accessing the I/O device 50 that is viewed from the root complex of the chip set 13-M of the PCI management server 20 is "0:2:0."

In Step S18, the configuration information of the upstream port bridge 412 and downstream port bridge 413 of the multi-root switch logic 410 and the configuration information of the I/O device 50 which have been obtained in Steps S15 to S17 are used, as illustrated in FIG. 5, to set routing IDs for MRS logic and routing IDs for access to the I/O device 50 (DEV access routing IDs) in registers or other given areas in the chip set 13-M. The PCI manager 202 also sets an MMIO space for accessing the physical function 501 and k MMIO spaces for accessing the virtual functions 502 in given areas in the memory 12-M.

In the example of FIG. 5, the PCI manager 202 obtains through the I/O port 131-M of the PCI management server 20 a routing ID of MR-IOV from the upstream port 41-0 to downstream port bridge 413 of the PCI-e switch 40, and the bus numbers of the port 411-0, the MRS configuration information 415, and the I/O device 50 are "9", "8", and "10", respectively, which makes routing IDs for the MRS logic 410 "8:0:0" and "9:0:0". As for device access routing IDs for access to the I/O device 50, "10:0:0" is set as a routing ID for accessing the physical function of the I/O device 50, and k routing IDs from "10:0:1" to "10:0:VFk" are set as routing IDs for accessing the virtual functions of the I/O device 50. The PCI manager 202 uses the PF driver 203 to initialize the physical function PF 501 and virtual functions 502 of the I/O device 50.

Through the above-mentioned processing, the physical function PF 501 and virtual functions 502 of the I/O device 50 are initialized by the PCI manager 202.

Figure 18:
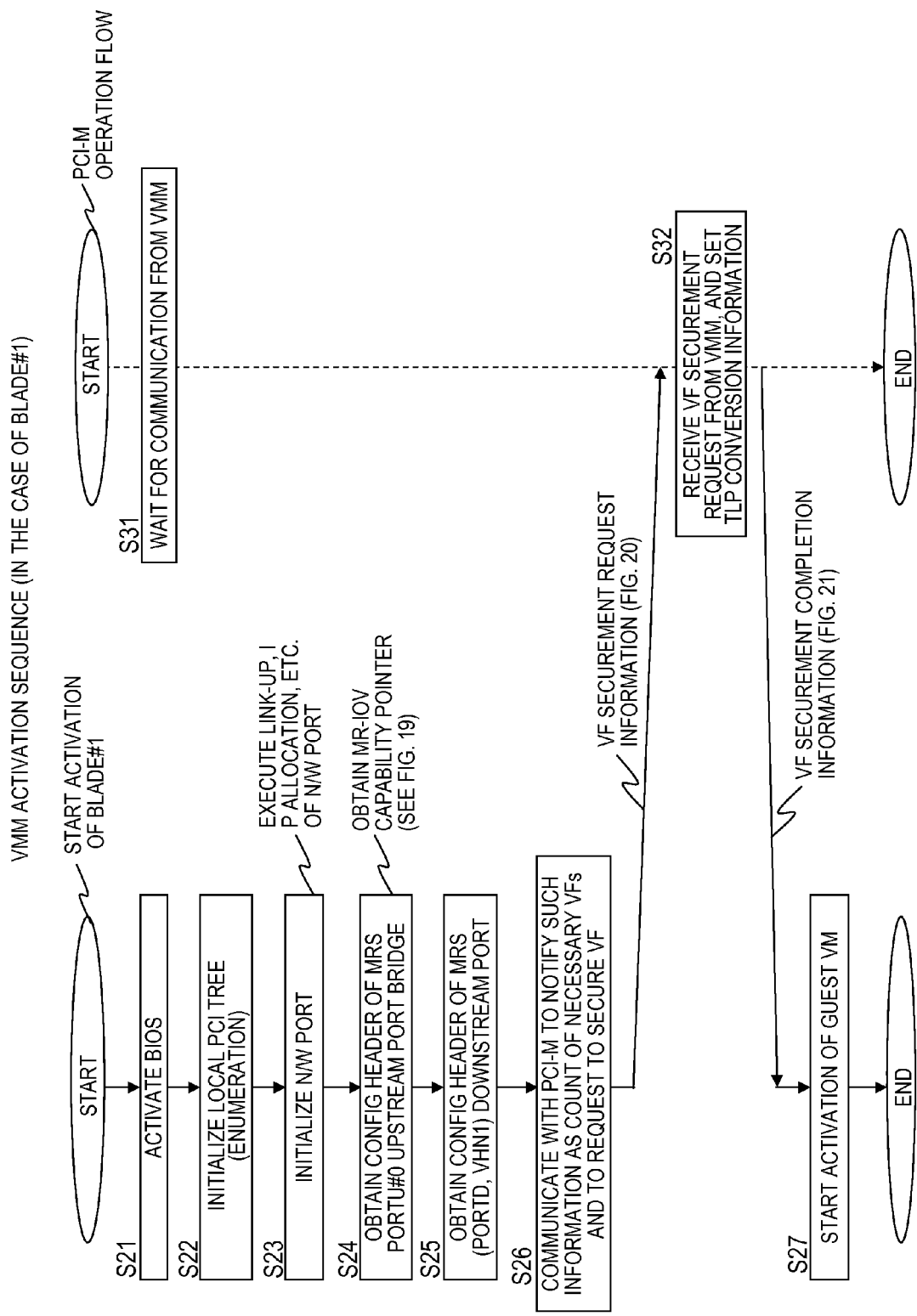
FIG. 18 shows an embodiment of this invention and is a flow chart illustrating an example of the processing of activating one of the blades 10-1 to 10-n and activating virtual machines (guest VMs) that is executed in Steps S6 and S7 of FIG. 16.

FIG. 18 is a flow chart illustrating an example of the processing of activating one of the blades 10-1 to 10-n and activating virtual machines (guest VMs) that is executed in Steps S6 and S7 of FIG. 16. In this example, the administration terminal 30 gives an instruction to activate the blade 10-1 (BLADE #1) of FIG. 1 and to create the virtual machines 101-0 (VM #0) and 101-1 (VM #1) on the virtual machine monitor 100-1 of the blade 10-1.

The PCI manager 202 has already been activated and has entered in Step S31 into a state of waiting for communication froms one of the virtual machine monitors 100-1 to 100-n (S 14 of FIG. 17).

The PCI management server 20 outputs an activation command to the blade 10-1 (BLADE #1), which is given by the administration terminal 30 to be activated. This processing is accomplished by, for example, instructing the BMC of the blade of interest to activate when the blades 10-1 to 10-n have BMCs, and sending a magic packet when it is one of the network interfaces 132-1 to 132-n that is given an instruction for activation.

When the blade 10-1 that is given an instruction for activation by the command from the PCI management server 20 is powered on, the BIOS or the EFI is activated in Step S21. As the BIOS (or EFI) is activated, in Step S22, the chip set 13-1 builds a local PCI tree under the root complex from devices within the blade 10-1, and initializes the local PCI tree. Specifically, the chip set 13-1 sets routing IDs for a local PCI tree as the Blade #1 illustrated in FIG. 5 in registers or other given areas in the chip set 13-1. In this example, routing IDs "0:0:0" to "8:1F:7" are set in respective entries as local routing IDs within the blade 10-1.

In Step S23, after the activation of the BIOS (or EFI) is completed, the virtual machine monitor 100-1 is activated. The virtual machine monitor 100-1 initializes the network interface 132-1. The initialization of the network interface 132-1 includes logging on to the network 70 and assigning an IP address.

In Step S24, the virtual machine monitor 100-1 accesses the PCI-e switch 40 through the I/O port 131-1 to obtain, from the upstream port bridge 412 of the multi-root switch logic 410, configuration information (for example, MR-IOV capability pointer) set to the port 411-1, which is coupled to the upstream port 41-0, and obtains the bus number (for example, 9) of the port 411-1. An MR-IOV capability pointer as configuration information is indicated by a VSEC_ID in bits 0 to 15 of the fourth bytes as illustrated in FIG. 19. The virtual machine monitor 100-1 obtains the virtual hierarchy number 1311 from the PCI-e switch 40. In the example of FIG. 5, the virtual hierarchy number 1311 (VH) of the blade 10-1 is "1".

In Step S25, the virtual machine monitor 100-1 accesses the PCI-e switch 40 through the I/O port 131-1 to obtain configuration information (for example, configuration header) of the downstream port bridge 413 of the MRS logic 410. The virtual machine monitor 100-1 allocates a device of the downstream port bridge 413 of the MRS logic 410 as a device number in a routing ID for access to the I/O device 50 that is viewed from the root complex. In this example, the routing ID for access to the I/O device 50 viewed from the root complex is "0:6:0".

Figure 20:
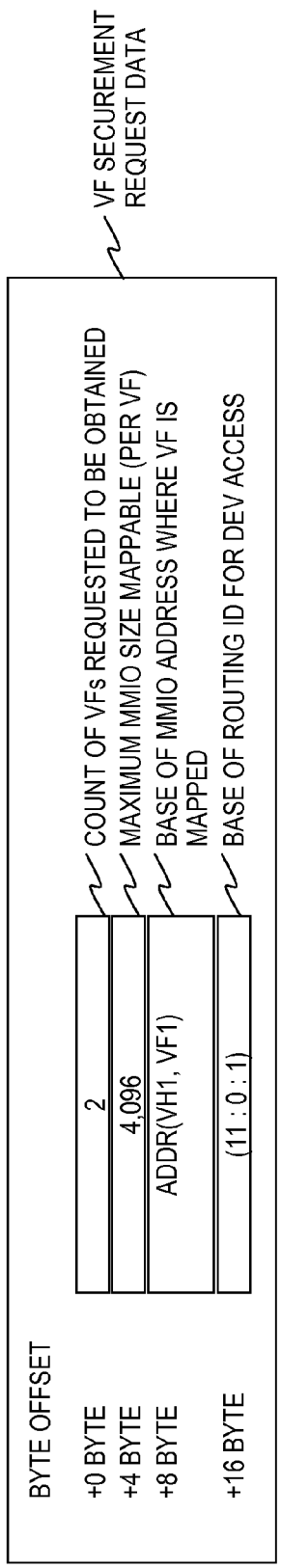
FIG. 20 shows an embodiment of this invention and is an explanatory diagram illustrating the format of virtual function securement request information.

In Step S26, a securement request containing the count of the virtual functions 502 that the virtual machine monitor 100-1 requires is sent as VF securement request data to the PCI manager 202 over the network 70. This securement request contains, as illustrated in FIG. 20, the count (=2) of the virtual functions 502 (VF) needed by the virtual machine monitor 100-1, the maximum MMIO size that can be set in the memory 12-1 by the virtual machine monitor 100-1 for a single virtual function 502, an MMIO base address and the virtual hierarchy number 1311 (VH=1) where the virtual function 502 is set, and routing IDs for access from the I/O device 50 ("11:0:1" and "11:0:2"). The bus number of the I/O device 50 that is viewed from the blade 10-1 is "11" and differs from the bus number viewed from the PCI management server 20. The blade 10-1 also notifies through the securement request a routing ID for access to the I/O device 50 ("0:6:0") which is obtained by the root complex. Routing IDs for access from the I/O device 50 can use values determined by the BIOSs when the blades 10-1 to 10-n are activated. FIG. 20 is an explanatory diagram illustrating the format of virtual function securement request information.

The PCI manager 202 receives a request to secure the virtual functions 502, and recognizes routing IDs of the MRS logic 410 in the PCI-e switch 40 and of the I/O device 50 that are viewed from the blade 10-1, as well as the MMIO space of the blade 10-1.

From routing IDs for access to the virtual functions 502 of the I/O device 50 that are requested by the blade 10-1, the PCI manager 202 allocates VF1 and VF2 of FIG. 5 to the blade 10-1, and allocates the blade 10-1 the MMIO addresses of VF1 and VF2 secured in the MMIO spaces of FIG. 4.

The PCI manager 202 then writes information that the securement request received from the blade 10-1 contains in the TLP conversion information 440 of the MR-SR conversion logic 430. The information to be written in the TLP conversion information 440 includes a routing ID for access to the I/O device 50 of the blade 10-1, the MMIO base address of the blade 10-1, and the virtual hierarchy number 1311 of the blade 10-1. Based on the count of the virtual functions 502 that are requested in the securement request, the PCI manager 202 obtains offsets between the MMIO addresses of the virtual functions 502 that are managed by the PCI manager 202 and MMIO addresses that are managed by the blade 10-1.

The PCI manager 202 writes, in the destination address qualification information 4401, which is a component of the TLP conversion information 440 (FIG. 7) of the MR-SR conversion logic 430, for each virtual function 502, the virtual hierarchy number 1311, the MMIO base address of the blade 10-1, the MMIO size, and an offset between the MMIO address of the virtual function 502 that is managed by the PCI manager 202 and an MMIO address that is managed by the blade 10-1. After writing those in an entry of the destination address qualification information 4401, the PCI manager 202 sets "1" which indicates validity to a "valid" field of the entry.

The PCI manager 202 next associates the routing IDs ("10:0:1" and "10:0:2") of the virtual functions 502 (VF1 and VF2) allocated to the blade 10-1 from the routing IDs of FIG. 5 with the routing IDs ("11:0:1" and "11:0:2") notified from the blade 10-1.

The PCI manager 202 writes the following information in the virtual function ID qualification information 4402 (FIG. 7), which is a component of the TLP conversion information 440 of the MR-SR conversion logic 430, for each routing ID for access to the I/O device 50 from one of the blades 10-1 to 10-n. The virtual hierarchy number 1311 (VH) of the blade in question is written in a "VH" field of the virtual function ID qualification information 4402. The routing ID for access to the I/O device 50 is written in a "VHx_Routing ID" field. A routing ID that is associated by the PCI manager 202 with the blade's routing ID is written in a "VH0 Routing ID" field. After writing those in an entry of the virtual function ID qualification information 4402, the PCI manager 202 sets "1" which indicates validity to a "valid" field of the entry.

The PCI manager 202 next writes, in route port ID information 4403 of FIG. 7, for each virtual hierarchy number 1311, a routing ID ("0:6:0") of the I/O device 50 that is recognized by the root complex of the blade 10-1. After writing the routing ID in an entry of the route port information 4403, the PCI manager 202 sets "1" which indicates validity to a "valid" field of the entry.

In the manner described above, values of VF securement request data received from the blade 10-1 are set in the TLP conversion information 440 of the MR-SR conversion logic 430, thereby setting the blade 10-1 as one of the blades that share the I/O device 50.

Figure 21:
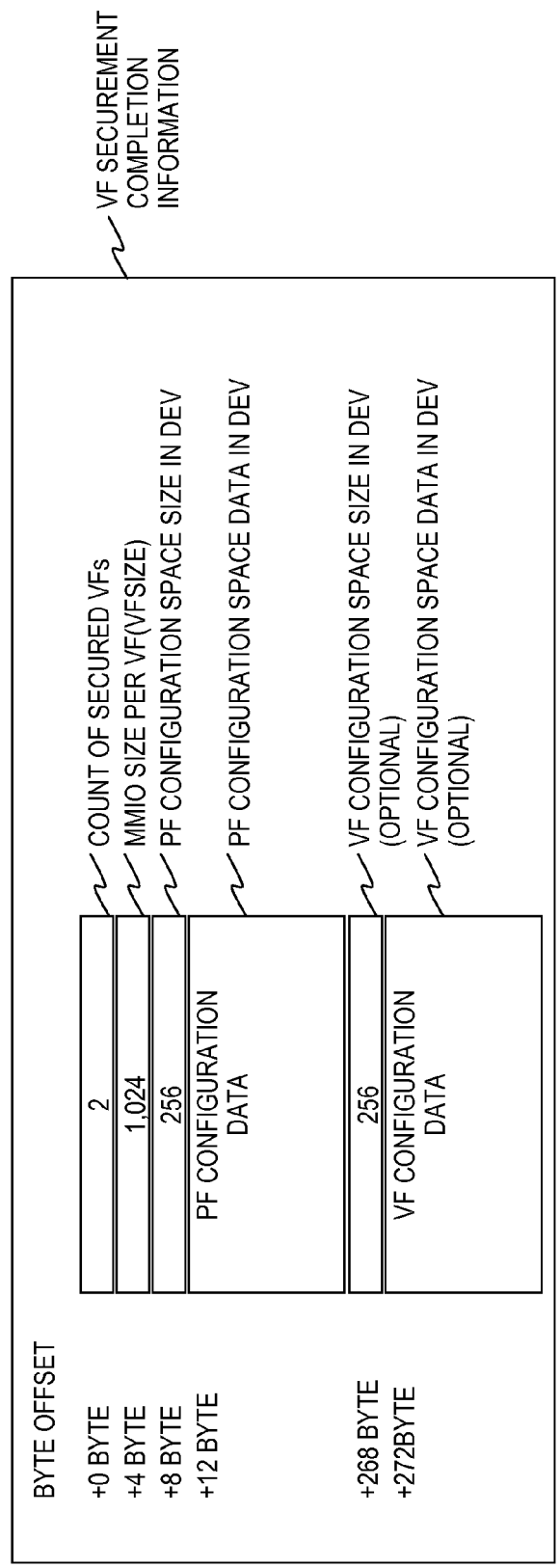
FIG. 21 shows an embodiment of this invention and is an explanatory diagram illustrating the format of virtual function securement completion information.

After finishing setting VF securement request data that is received from the blade 10-1 in the TLP conversion information 440 of the MR-SR conversion logic 430, the PCI manager 202 transmits the information set in the TLP conversion information 440 to the blade 10-1 over the network 70 as VF securement completion data. An example of the VF securement completion data is illustrated in FIG. 21. FIG. 21 is an explanatory diagram illustrating the format of virtual function securement completion information. In FIG. 21, VF securement completion data includes the count (=2) of the virtual functions 502 that are secured in the TLP conversion information 440 by the PCI manager 202, the MMIO size per virtual function 502, the configuration information space size of the physical function PF 501 of the I/O device 50, configuration space data of the physical function 501 of the I/O device 50, the configuration space size of the virtual functions 502 of the I/O device 50, and configuration space data of the virtual functions 502 of the I/O device 50.

The VF securement completion data is received by the virtual machine monitor 100-1. In Step S27, the virtual machine monitor 100-1 activates the virtual machines 101-1 and 101-2 (guest VMs) which are designated by the administration terminal 30, and allocates the virtual functions 502 (VF1 and VF2) of the I/O device 50 that are received from the PCI manager 202 to the virtual machines 101-1 and 101-2 on a one-on-one basis.

Through the above-mentioned processing, the PCI manager 202 secures the virtual functions 502 of the I/O device 50 that are needed by the virtual machine monitor 100-1, and the virtual machine monitor 100-1 can allocate the virtual functions 502 secured by the PCI manager 202 to the activated virtual machines 101-1 and 101-2.

The above-mentioned processing is executed in a similar manner when the other blades, 10-2 to 10-n, are activated, with the result that information of the blades 10-1 to 10-n which share the I/O device 50 is added to the TLP conversion information 440.

Figure 22:
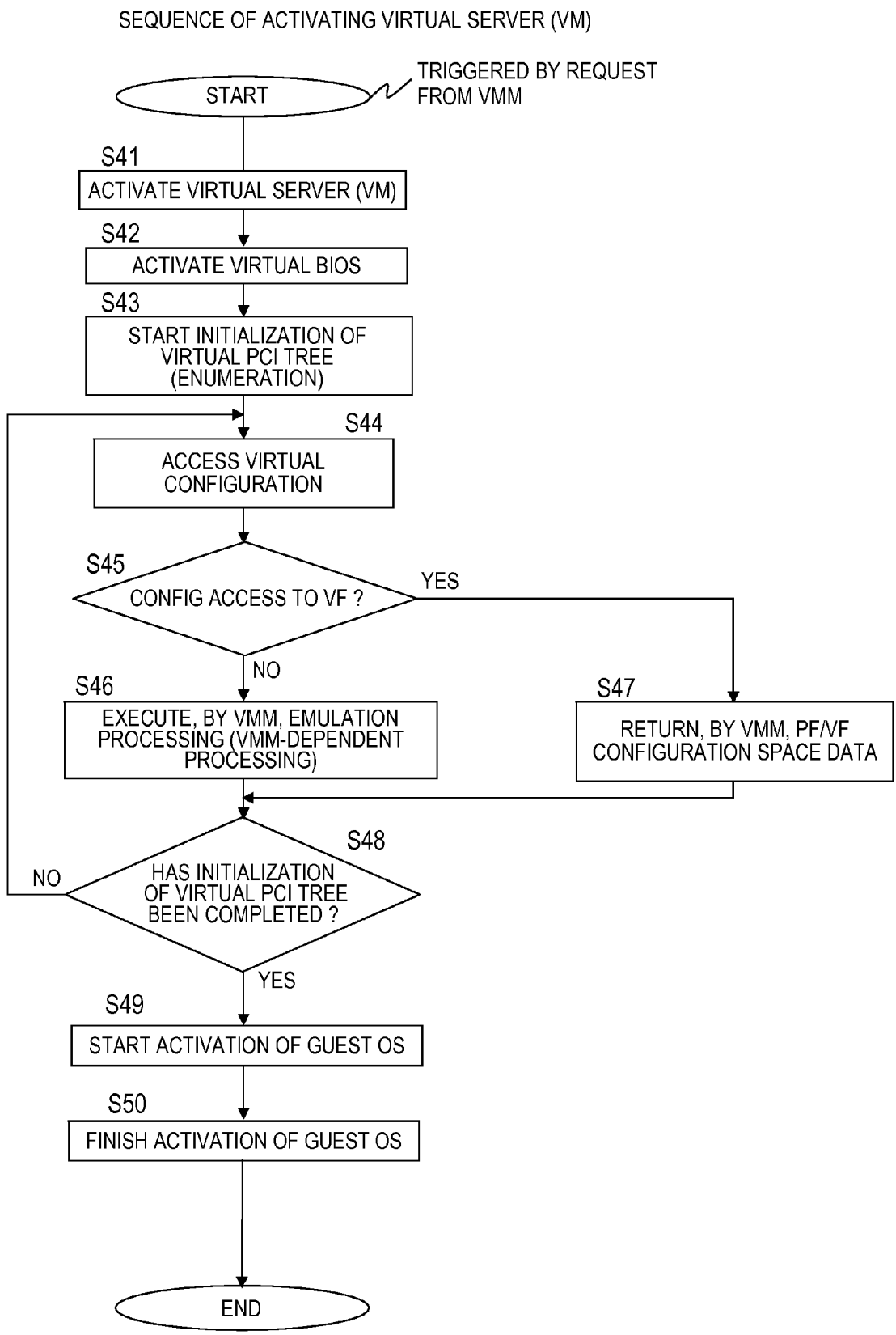
FIG. 22 shows an embodiment of this invention and is a flow chart illustrating an example of the processing of activating the virtual machine 101-0 (101-1) which is executed in Step S27 of FIG. 18.

FIG. 22 is a flow chart illustrating an example of the processing of activating the virtual machine 101-0 (101-1) which is executed in Step S27 of FIG. 18.

The virtual machine monitor 100-1 activates the virtual machine 101-0 in Step S41 and, in Step S42, activates a virtual BIOS allocated to the virtual machine 101-0. In Step S43, the virtual BIOS initializes a virtual PCI tree.

In Step S44, the virtual BIOS starts accessing a virtual configuration provided by the virtual machine monitor 100-1. In Step S45, the virtual machine monitor 100-1 determines whether or not the access target of the virtual BIOS is one of the virtual functions 502 of the I/O device 50. In the case where the virtual BIOS is accessing other components than the virtual functions 502 of the I/O device 50, the virtual machine monitor (VMM) 100-1 executes emulation of the access target in Step S46. In the case where the virtual BIOS is accessing one of the virtual functions 502, on the other hand, information obtained from virtual function securement response information via the PCI manager 202 is returned in Step S47 by the virtual machine monitor 100-1. The information returned by the virtual machine monitor 100-1 includes the configuration information space size of the physical function PF 501 of the I/O device 50, configuration space data of the physical function 501 of the I/O device 50, the configuration space size of the virtual function 502 of the I/O device 50, and configuration information space data of the virtual function 502 of the I/O device 50.

In Step S48, the virtual machine monitor 100-1 determines whether or not the virtual BIOS has finished the initialization of the virtual PCI tree. When the initialization of the virtual PCI tree has not been finished, the virtual machine monitor 100-1 returns to Step S44 to repeat the initialization. When the initialization of the virtual PCI tree is completed, the virtual machine monitor 100-1 starts activating the OS 102-0 (guest OS) in Step S49. In Step S50, the activation of the OS 102-0 is completed, and the virtual machine 101-0 is now ready to provide an application program or a service.

In the manner described above, when the virtual BIOS or the OS 102-0 (guest OS) is to obtain configuration information of one of the virtual functions 502 of the I/O device 50, the virtual machine monitor 100-1 provides information of the physical function 501 and the virtual function 502 which has been obtained from the PCI manager 202. The OS 102-0 or the virtual BIOS can thus utilize the virtual function 502 by loading the VF driver 103.

Figure 23:
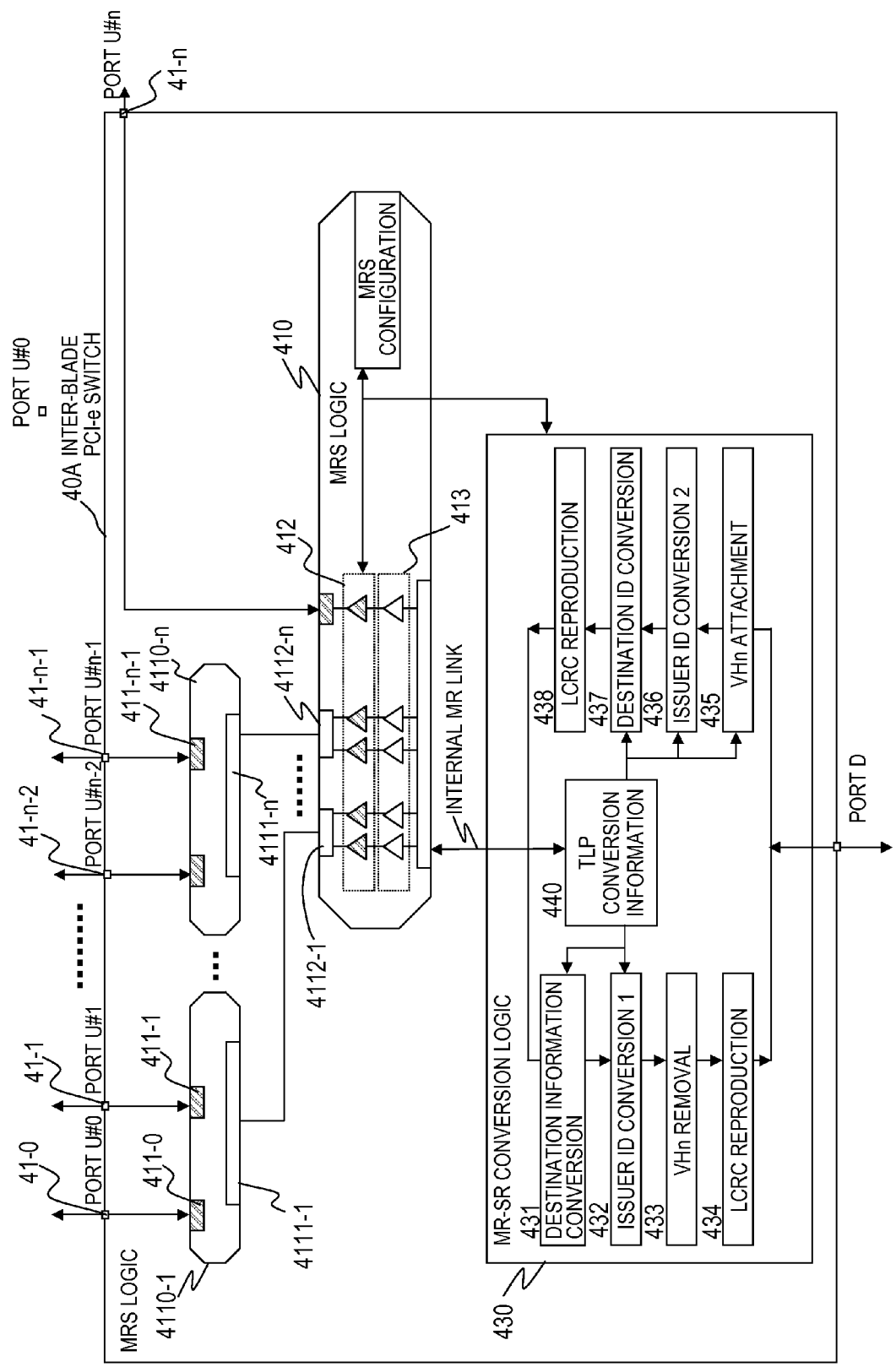
FIG. 23 illustrates a modification example of the embodiment described above, and is a block diagram of MRS logical in a PCI-e switch.

FIG. 23 illustrates a modification example of the embodiment described above, and is a block diagram of MRS logical in a PCI-e switch. In FIG. 23, of the components of the MRS logic 410 illustrated in FIG. 3, the ports 411-1 to 411-n coupled to the upstream port bridge 412 are separated from the MRS logic 410 so that upstream ports 41-0 to 41-n can be further provided.

The upstream ports 41-0 to 41-n of the PCI-e switch 40 are broken into sets of a given count of upstream ports 41 (for example, two upstream ports 41), and each set is coupled to one of MRS logic 4110-1 to MRS logic 4110-n. Each of the MRS logic 4110-1 to the MRS logic 4110-n is provided with two ports 411 (in the case of the MRS logic 4110-1, the ports 411-0 and 411-1) that are each coupled to one of the upstream ports 41-0 to 41n. Each of the MRS logic 4110-1 to the MRS logic 4110-*n* is provided with one of ports 4111-1 to 4111-*n* on the side of the MRS logic 410. The ports 4111-1 to 4111-*n* are each coupled to one of ports 4112-1 to 4112-*n*, which are provided in the MRS logic 410.

In this modification example, the side of the upstream ports 41-0 to 41-*n* of the MRS logic 410 is cascaded, and hence the upstream ports 41-0 to 41-*n* of the blade server 1 can be configured flexibly.

While the above-mentioned embodiment describes a configuration in which the chip sets 13-1 to 13-*n* and the processors 11-1 and 11-2 are independent of each other, the chip sets 13-1 to 13-*n* may be incorporated in the processors 11-1 and 11-2.

The above-mentioned embodiment illustrates an example in which the PCI manager 202 is run on the PCI management server 20, but the PCI manager 202 may be run on one of the blades 10-1 to 10*n*.

As has been described, this invention is applicable to a computer system in which a PCI Express switch couples a plurality of physical computers to an I/O device. This invention is particularly suitable for a computer system and a PCI switch in which physical computers make access by MR-IOV and an I/O device makes access by SR-IOV.

While the present invention has been described in detail and pictorially in the accompanying drawings, the present invention is not limited to such detail but covers various obvious modifications and equivalent arrangements, which fall within the purview of the appended claims.

What is claimed is:

1. A server system comprising:
a plurality of servers;
an input/output (I/O) device;
a switch for coupling the plurality of servers and the I/O device; and
a manager for initializing the switch,
wherein the I/O device includes a virtual function (VF) provided by a virtualization function;
wherein the switch includes identifier association information which indicates associations between first identifiers recognizable to the plurality of servers and second identifiers managed by the manager;
wherein, upon receipt of a packet from one of the plurality of servers, the switch converts a first identifier included in the packet into a second identifier associated with the first identifier based on the identifier association information;
wherein the switch sends the packet to which the conversion has been applied to the I/O device;
wherein, upon receipt of a packet from one of the plurality of servers, the switch attaches a server identifier for identifying the transmission source server to the packet;
wherein the switch transfers the packet with the server identifier attached within the switch; and
wherein the switch sends the packet from which the server identifier has been removed to the I/O device.

2. The server system according to claim 1,
wherein each of the plurality of servers manages accesses from the server to the VF based on the first identifiers; and
wherein the I/O device manages accesses from the plurality of servers to the VF based on the second identifiers.

3. The server system according to claim 1,
wherein the switch further includes memory-mapped input/output (MMIO) address association information which indicates associations between MMIO address area information on the VF recognizable to the plurality of servers and MMIO address area information on the VF managed by the manager; and
wherein, upon receipt of a packet from one of the plurality of servers, the switch further converts a destination address of the packet in accordance with the MMIO address association information.

4. The server system according to claim 1,
wherein the switch is a PCI-SIG compliant PCI switch; and
wherein the I/O device is an I/O device compliant with Single Root I/O Virtualization and Sharing Specification (SR-IOV) prescribed by PCI-SIG, or upward-compatible with SR-IOV.

5. A switching apparatus for coupling a plurality of servers and an I/O device including a virtual function (VF) provided by a virtualization function, the switching apparatus comprising:
first ports for coupling to the plurality of servers;
a second port for coupling to the 1/0 device;
an identifier manager for managing associations between first identifiers recognizable to the plurality of servers and second identifiers managed by a manager for initializing the switching apparatus; and
a transfer controller for controlling transferring packets addressed to the 1/0 device sent from the plurality of servers to the I/O device,
wherein, when one of the first ports receives a packet addressed to the I/O device from one of the plurality of servers, the transfer controller converts a first identifier included in the packet into a second identifier associated with the first identifier based on the associations managed by the identifier manager;
wherein in the second port sends the packet to which the transfer controller has applied the conversion to the I/O device;
wherein, when one of the first ports receives a packet addressed to the I/O device from one of the plurality of servers, the switching apparatus attaches a server identifier to identify a transmission source server to the packet;
wherein the switching apparatus transfers the packet with the server identifier attached from the first port to the second port within the switching apparatus: and
wherein the second port sends the packet from which the server identifier has been removed to the I/O device.

6. The switching apparatus according to claim 5,
wherein the first identifiers are identifiers which are used by the plurality of servers to manage accesses from the plurality of servers to the VF; and
wherein the second identifiers are identifiers which are used by the I/O device to manage accesses from the plurality of servers to the VF.

7. The switching apparatus according to claim 5, further comprising an MMIO address association manager for managing MMIO address association information between MMIO address area information on the VF recognizable to the plurality of servers and MMIO address area information on the VF managed by an I/O device manager,
wherein, when one of the first ports receives a packet addressed to the I/O device from one of the plurality of servers, the transfer controller performs conversion of the destination address of the packet in accordance with the MMIO address association information.

8. The switching apparatus according to claim 5, wherein the switching apparatus is a PCI-SIG compliant PCI switch.

9. A method of managing an I/O device shared by a plurality of servers in a server system including the plurality of servers, the I/O device, a switch for coupling the plurality of servers and the I/O device, and a manager for initializing the switch, the method comprising:

creating, by the I/O device, a plurality of virtual functions (VFs) provided by a virtualization function;

managing, by the switch, identifier association information which indicates associations between first identifiers of the VFs recognizable to the plurality of servers and second identifiers of the VFs managed by the manager;

converting, by the switch, a first identifier included in a packet received from one of the servers into a second identifier associated with the first identifier based on the identifier association information, upon receipt of the packet;

sending, by the switch, the packet to which the conversion has been applied to the I/O device;

attaching, by the switch, a server identifier (VHN) for identifying a transmission source server, upon receipt of a packet from one of the servers;

transferring, by the switch, the packet with the server identifier attached within the switch; and sending, by the switch, the packet from which the server identifier has been removed to the I/O device.

10. The method of managing an I/O device according to claim 9, further comprising:

managing, by the plurality of servers, accesses from the servers to the VFs based on the first identifiers; and managing, by the I/O device, accesses from the servers to the VFs based on the second identifiers.

11. The method of managing an I/O device according to claim 9, further comprising:

managing, by the switch, MMIO address association information between MMIO address area information on the VFs recognizable to the plurality of servers and MMIO address area information on the VFs managed by an I/O device manager; and converting, by the switch, a destination address of a packet received from one of the plurality of servers in accordance with the MMIO address association information upon receipt of the packet.

* * * * *

UNITED STATES PATENT AND TRADEMARK OFFICE
CERTIFICATE OF CORRECTION

| | | |
|---|---|---|
| PATENT NO. | : 8,341,327 B2 | |
| APPLICATION NO. | : 12/546264 | |
| DATED | : December 25, 2012 | |
| INVENTOR(S) | : Baba et al. | |

It is certified that error appears in the above-identified patent and that said Letters Patent is hereby corrected as shown below:

On column 1 of the specification, the section entitled Claim of Priority should read as:

The present application claims priority from Japanese patent application JP2008-250208 filed on September 29, 2008, the content of which is hereby incorporated by reference into this application.

Signed and Sealed this
Nineteenth Day of February, 2013

Teresa Stanek Rea
*Acting Director of the United States Patent and Trademark Office*